US009311924B1

(12) United States Patent
Blesser

(10) Patent No.: US 9,311,924 B1
(45) Date of Patent: Apr. 12, 2016

(54) SPECTRAL WELLS FOR INSERTING WATERMARKS IN AUDIO SIGNALS

(71) Applicant: TLS Corp., Cleveland, OH (US)

(72) Inventor: Barry Blesser, Belmont, MA (US)

(73) Assignee: TLS CORP., Cleveland, OH (US)

( * ) Notice: Subject to any disclaimer, the term of this patent is extended or adjusted under 35 U.S.C. 154(b) by 0 days.

(21) Appl. No.: 14/855,787

(22) Filed: Sep. 16, 2015

Related U.S. Application Data

(63) Continuation-in-part of application No. 14/803,655, filed on Jul. 20, 2015.

(60) Provisional application No. 62/196,897, filed on Jul. 24, 2015.

(51) Int. Cl.
*G06F 17/00* (2006.01)
*G10L 19/018* (2013.01)

(52) U.S. Cl.
CPC .................................... *G10L 19/018* (2013.01)

(58) Field of Classification Search
CPC ............... G10L 19/018; H04N 19/467; H04N 21/23892; H04N 21/8358; G06T 2201/0052; G06T 2201/0051; G06T 2201/0061
See application file for complete search history.

(56) References Cited

U.S. PATENT DOCUMENTS

| | | | | |
|---|---|---|---|---|
| 7,035,700 B2 * | 4/2006 | Gopalan | G10L 19/018 380/236 |
| 8,762,146 B2 * | 6/2014 | Geyzel | G10L 19/018 358/3.2 |
| 2004/0068399 A1 * | 4/2004 | Ding | G10L 21/038 704/200.1 |
| 2004/0081243 A1 * | 4/2004 | Kondo | H04B 1/665 375/242 |
| 2010/0057231 A1 * | 3/2010 | Slater | G10L 19/018 700/94 |
| 2010/0303284 A1 | 12/2010 | Hannigan et al. | |
| 2011/0173012 A1 | 7/2011 | Rettelbach et al. | |
| 2011/0238425 A1 | 9/2011 | Neuendorf et al. | |
| 2011/0305352 A1 | 12/2011 | Villemoes et al. | |
| 2012/0089393 A1 | 4/2012 | Tanaka | |
| 2013/0171926 A1 * | 7/2013 | Perret | G10L 19/018 455/3.06 |
| 2013/0173275 A1 | 7/2013 | Liu et al. | |
| 2014/0297271 A1 | 10/2014 | Geiser | |
| 2015/0071446 A1 | 3/2015 | Sun et al. | |

* cited by examiner

*Primary Examiner* — Curtis Kuntz
*Assistant Examiner* — Thomas Maung
(74) *Attorney, Agent, or Firm* — Renner, Otto, Boisselle & Sklar, LLP.

(57) ABSTRACT

A method to watermark an audio signal includes inserting a first symbol in a spectral well, the spectral well corresponding to at least one of a second spectral portion when amplitude of a first spectral portion and amplitude of a third spectral portion exceed amplitude of the second spectral portion, or the second temporal portion when amplitude of a first temporal portion and amplitude of a third temporal portion exceed amplitude of the second temporal portion.

20 Claims, 28 Drawing Sheets

SPECTRAL WELLS FOR INSERTING WATERMARKS IN AUDIO SIGNALS

FIELD OF THE INVENTION

The present disclosure relates to audio processing. More particularly, the present disclosure relates to methods and machines for detecting, creating and enhancing spectral wells for inserting watermark in audio signals.

BACKGROUND

Audio watermarking is the process of embedding information in audio signals. To embed this information, the original audio may be changed or new components may be added to the original audio. Watermarks may include information about the audio including information about its ownership, distribution method, transmission time, performer, producer, legal status, etc. The audio signal may be modified such that the embedded watermark is imperceptible or nearly imperceptible to the listener, yet may be detected through an automated detection process.

Watermarking systems typically have two primary components: an encoder that embeds the watermark in a host audio signal, and a decoder that detects and reads the embedded watermark from an audio signal containing the watermark. The encoder embeds a watermark by altering the host audio signal. Watermark symbols may be encoded in a single frequency band or, to enhance robustness, symbols may be encoded redundantly in multiple different frequency bands. The decoder may extract the watermark from the audio signal and the information from the extracted watermark.

The watermark encoding method may take advantage of perceptual masking of the host audio signal to hide the watermark. Perceptual masking refers to a process where one sound is rendered inaudible in the presence of another sound. This enables the host audio signal to hide or mask the watermark signal during the time of the presentation of a loud tone, for example. Perceptual masking exists in both the time and frequency domains. In the time domain, sound before and after a loud sound may mask a softer sound, so called forward masking (on the order of 50 to 300 ms) and backward masking (on the order of 1 to 5 ms). Masking is a well know psychoacoustic property of the human auditory system. In the frequency domain, small sounds somewhat higher or lower in frequency than a loud sound's spectrum are also masked even when occurring at the same time. Depending on the frequency, spectral masking may cover several 100 Hz.

The watermark encoder may perform a masking analysis to measure the masking capability of the audio signal to hide a watermark. The encoder models both the temporal and spectral masking to determine the maximum amount of watermarking energy that can be injected. However, the decoder can only be successful if the signal to noise ratio (S/N) is adequate, and the peak amplitude of the watermarking is only part of that ratio. One needs to consider the noise experienced by the decoder. There are multiple noise sources but there is one noise source that can dominate: the energy in the audio program that exists at the same time and frequency of the watermarking.

The audio program both creates the masking envelop and it exists at the same time and frequency of the injected watermark. The watermark peak is determined by the masking and the watermark's noise is determined by the residual audio program. These two parameters determine the S/N. The S/N may be insufficient for the decoder to successfully extract the information.

SUMMARY OF THE INVENTION

The present disclosure provides methods and machines for detecting, creating and enhancing spectral wells for inserting watermarks in audio signals. The spectral wells correspond to relatively low levels of energy of a spectral portion of the audio signal when compared to neighboring spectral portions. Spectral wells reduce the likelihood of the audio signal interfering with the decoder's ability to decode the watermark. Spectral wells improve the decoder's performance by increasing the S/N. Inserting the watermark in an audio signal in which a spectral well has been created may increase the ability of the decoder to effectively decode the watermark.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Although the present disclosure describes various embodiments in the context of watermarking station identification codes into the station audio programming to identify which stations people are listening to, it will be appreciated that this exemplary context is only one of many potential applications in which aspects of the disclosed systems and methods may be used.

Figure 1:
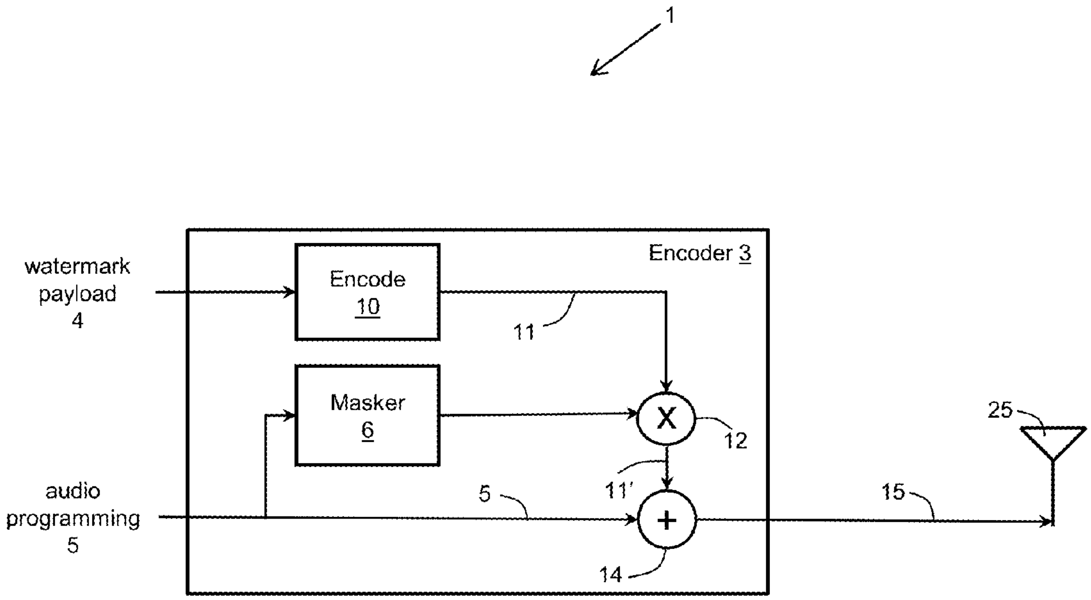
FIG. 1 illustrates a simplified block diagram of an exemplary system for electronic watermarking of audio signals.

FIG. 1 illustrates a simplified block diagram of an exemplary system 1 for electronic watermarking. The main component of the watermarking system 1 is the encoder 3, which includes the masker 6 and the watermarking encode 10. The encode 10 receives the watermark payload 4 including, for example, a radio station identification, the time of day, etc. and encodes it to produce the watermark signal 11. The encode 10 encodes this information in possibly an analog signal that will be added to the audio programming 5 someplace in the transmitter chain.

But the amount of watermarking that can be injected varies because the degree of masking depends on the programming 5, which may include, announcers, soft-jazz, hard-rock, classical music, sporting events, etc. Each audio source has its own distribution of energy in the time-frequency space and that distribution controls the amount of watermarking that can be injected at a tolerable level. The masking analysis process has embedded numerous parameters, which need to be optimized. The masker 6 receives the audio programming signal 5 and analyses it to determine, for example, the timing and energy at which the watermark signal 11 will be broadcasted. The masker 6 may take advantage of perceptual masking of the audio signal 5 to hide the watermark.

The output of the masker 6 is provided to the multiplier 12 and its output is the adjusted watermarking signal 11'. The summer 14 receives the audio programming signal 5 and embeds the adjusted watermarking signal 11' onto the audio programming signal 5. The result is the output signal 15, which includes the information in the audio programming signal 5 and the adjusted watermarking signal 11'. The modulator/transmitter 25 at the station broadcasts the transmission, which includes the information in the output signal 15, through the air, internet, satellite, etc.

In the field (not shown) an AM/FM radio, television, etc. that includes a receiver, a demodulator, and a speaker receives, demodulates and reproduces the output signal 15. A decoder receives and decodes the received signal to, hopefully, obtain the watermark or the information within the watermark. The decoder, which has the responsibility of extracting the watermarking payload, is faced with the challenge of operating in an environment where both the local sounds and the program being transmitted may undermine the performance of the decoder. Moreover, if the energy of the audio signal at the determined temporal portion in which the watermark was inserted is relatively high at the frequency band in which the watermark symbol was encoded, this may further impair the ability of the decoder to effectively decode the watermark.

Figure 2:
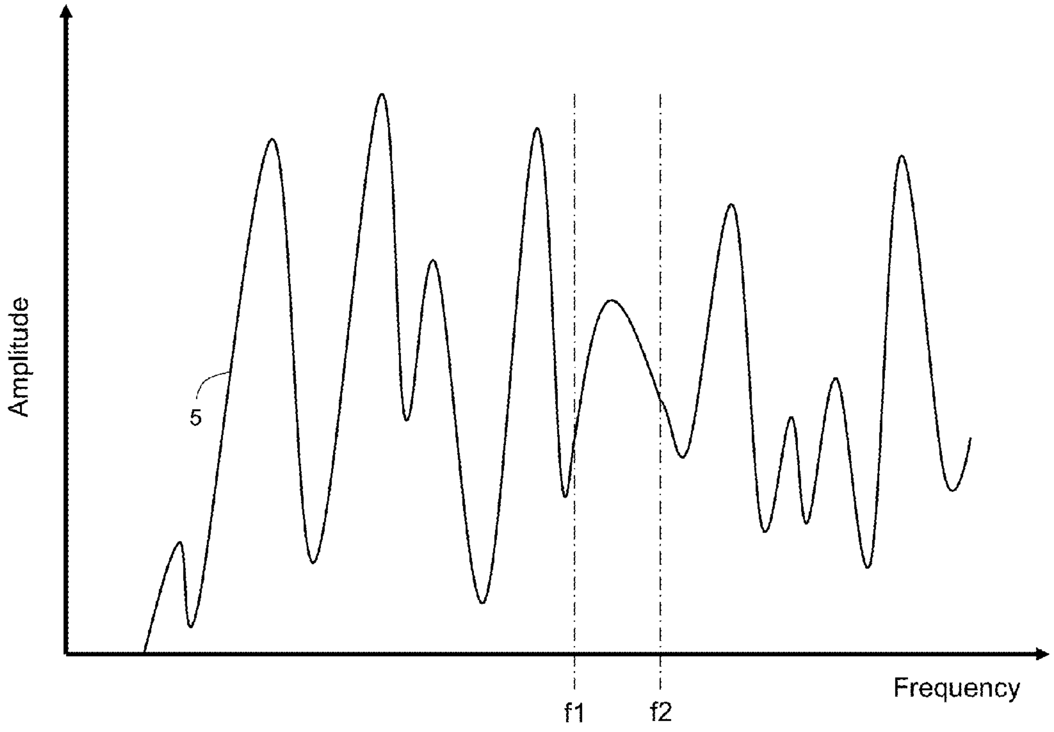
FIG. 2 illustrates an exemplary frequency domain representation of an audio signal at the time selected for insertion of a watermark.

FIG. 2 illustrates an exemplary frequency domain representation of an audio signal at the time that the masker 6 of FIG. 1 has selected for insertion of the watermark. The frequency band in which the watermark is to be inserted is the band between the frequencies f1 and f2. Notice, however, that energy in the frequency band between the frequencies f1 and f2 is relatively high. Inserting the watermark in the frequency band between the frequencies f1 and f2, with its relatively high energy of the audio signal, may impair the ability of the decoder to later effectively decode the watermark. The audio signal may have too much energy in the frequency band between the frequencies f1 and f2 for energy corresponding to the watermark, once inserted in the frequency band, to be detected effectively.

Spectral Wells

Figure 3:
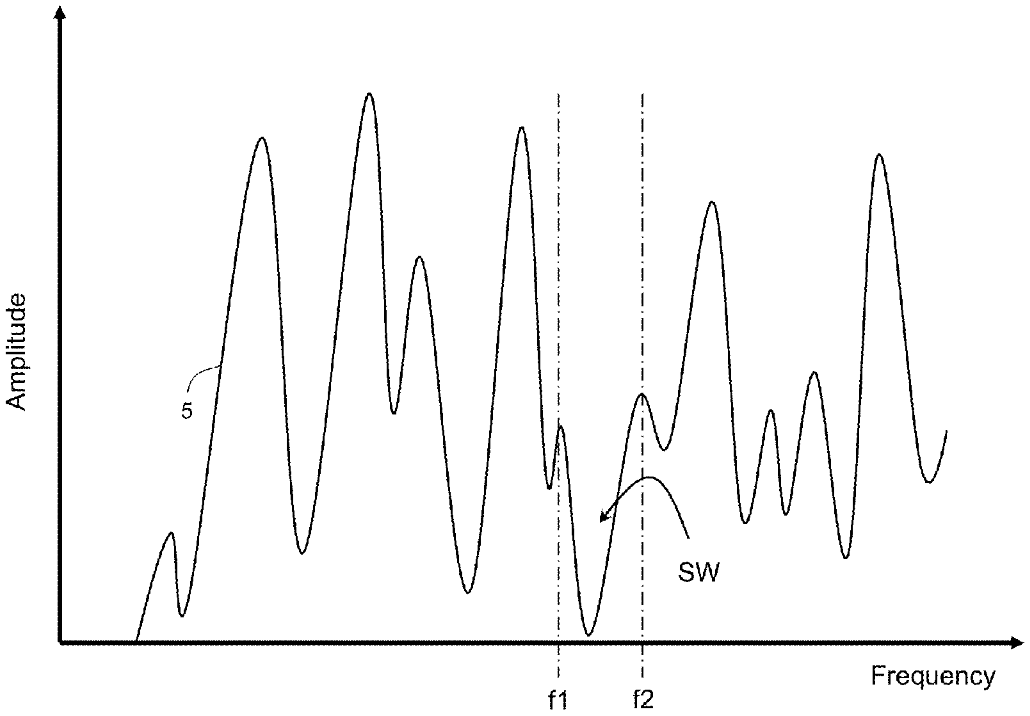
FIG. 3 illustrates an exemplary frequency domain representation of the audio signal at the time selected for insertion of the watermark.

FIG. 3 illustrates an exemplary frequency domain representation of the audio signal at the time selected for insertion of the watermark. In FIG. 3, in contrast with FIG. 2, a spectral well SW exists in the frequency band between the frequencies f1 and f2. The spectral well SW corresponds to, when comparing the curves of FIGS. 2 and 3, reduced or attenuated energy of the audio signal in the frequency band between the frequencies f1 and f2 at the time determined for insertion of the watermark. Notice that in FIG. 3 energy in the frequency band between the frequencies f1 and f2 is relatively low when compared to that of FIG. 2.

Inserting the watermark in the frequency band between the frequencies f1 and f2 of FIG. 3, with its relatively low energy of the audio signal, may increase the ability of the decoder to later effectively decode the watermark. The audio signal has little energy in the frequency band between the frequencies f1 and f2. Energy corresponding to the watermark, once inserted in the frequency band, should be detected effectively. The chances for detection of the watermark, once inserted in the frequency band between f1 and f2, have increased from the curve of FIG. 2 to the curve of FIG. 3. The shape of the spectral well SW of FIG. 3 is only exemplary. Spectral wells may have shapes different from that shown in FIG. 3.

Although the present disclosure for ease of explanation discloses spectral wells as mostly corresponding to reduced or attenuated energy of the audio signal in a frequency band at the time determined for insertion of the watermark, a spectral well may also be contextualized as reduced or attenuated energy of the audio signal in a time range at the frequency range determined for insertion of the watermark or even as reduced or attenuated energy of the audio signal in a time-frequency region of the audio signal. Although for ease of explanation the present disclosure describes spectral wells as two dimensional (i.e., frequency and amplitude), spectral wells are three dimensional in nature (i.e., time, frequency and amplitude) as shown in some of the figures below.

Spectral Well—Detection

A "natural" spectral well may exist in the time-frequency region of a given channel. Assume a channel from 800 to 840 Hz. If the speech in this region was somewhat lower than the neighboring spectral regions, below 800 and above 840 Hz, for a certain amount of time, the 800 to 840 Hz channel would include a spectral well.

Figure 4:
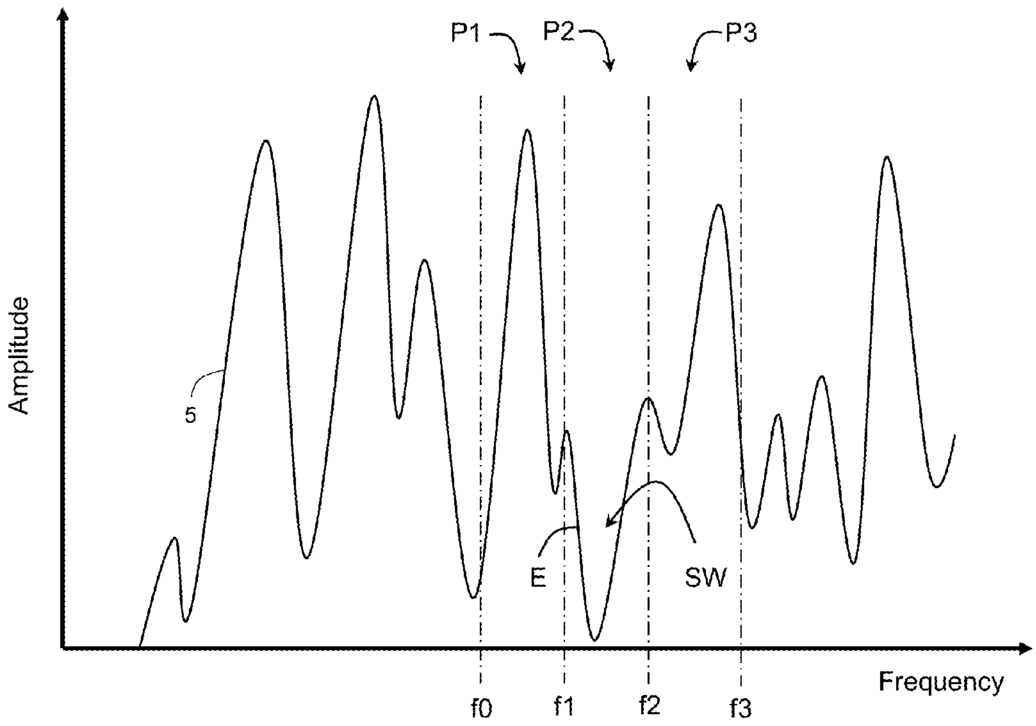
FIG. 4 illustrates an exemplary frequency domain representation of an audio signal at the time selected for insertion of the watermark.

FIG. 4 illustrates an exemplary frequency domain representation of an audio signal 5 at a time t1 selected for insertion of the watermark. The audio signal of FIG. 4 exhibits a natural spectral well in the spectral region P2 between f1 and f2 that, assuming the spectral well has a proper time duration corresponding to the time duration of a watermark symbol, is an ideal natural spectral well in which to insert the watermark symbol so that perception of the newly inserted watermark symbol fuses with neighboring portions of the audio signal; i.e., perceptual fusion.

The algorithm for detecting and utilizing such a natural spectral well for perceptual fusion may include measuring amplitude of three spectral portions of the audio signal 5 corresponding to the time interval beginning at time t1. The three spectral portions measured include a first portion P1 corresponding to a first frequency range between f0 and f1, a second portion P2 corresponding to a second frequency range between f1 and f2, and a third portion P3 corresponding to a third frequency range between f2 and f3. When the amplitude of the first portion P1 and the amplitude of the third portion P3 exceed the amplitude of the second portion P2, the second portion P2 may be identified as including a spectral well as shown in FIG. 4. A watermark symbol may then be inserted in the identified spectral well of the audio signal corresponding to the second portion P2.

The algorithm for identifying a spectral well may involve continuously measuring portions of the audio signal (i.e., P1, P2, P3 . . . , Pn) until a spectral well is identified. What constitutes a proper portion of the audio signal for measurement may be determined based on the frequency location and/or prescribed bandwidth and/or time duration of a spectral channel at that frequency location. In the example of FIG. 4, a determination may have been made that a spectral channel (i.e., a portion of the audio signal 5 at which a watermark symbol is to be inserted) is to have a certain bandwidth and time. The portions P1, P2, and P3 may be selected so that the corresponding bandwidths 10 to f1, f1 to f2, and f2 to f3, respectively, are of that determined certain bandwidth and so that the portions P1, P2, and P3 are of the certain time duration.

Spectral Well—Creation

In some cases, one could create the valley (i.e., the spectral well). For example, one may create a spectral well by removing a spectral portion of the audio signal 5 (e.g., the portion between f1 and f2 in FIG. 2), by increasing the intensity of neighboring portions, or both. In this case, the algorithm would be creating the valley for the spectral well rather than detecting its existence in the original. In one embodiment, a determination may be made as to whether to create a spectral well based on, for example, amplitude of the audio signal or a signal-to-noise ratio (S/N) of the watermark signal to the audio signal at the spectral and temporal location where the watermark is to be inserted. In other embodiments, a determination may be made as to the depth of the spectral well based on similar considerations (i.e., amplitude of the audio signal or S/N of the watermark signal to the audio signal).

Spectral Well—Creation by Removal

Figure 5:
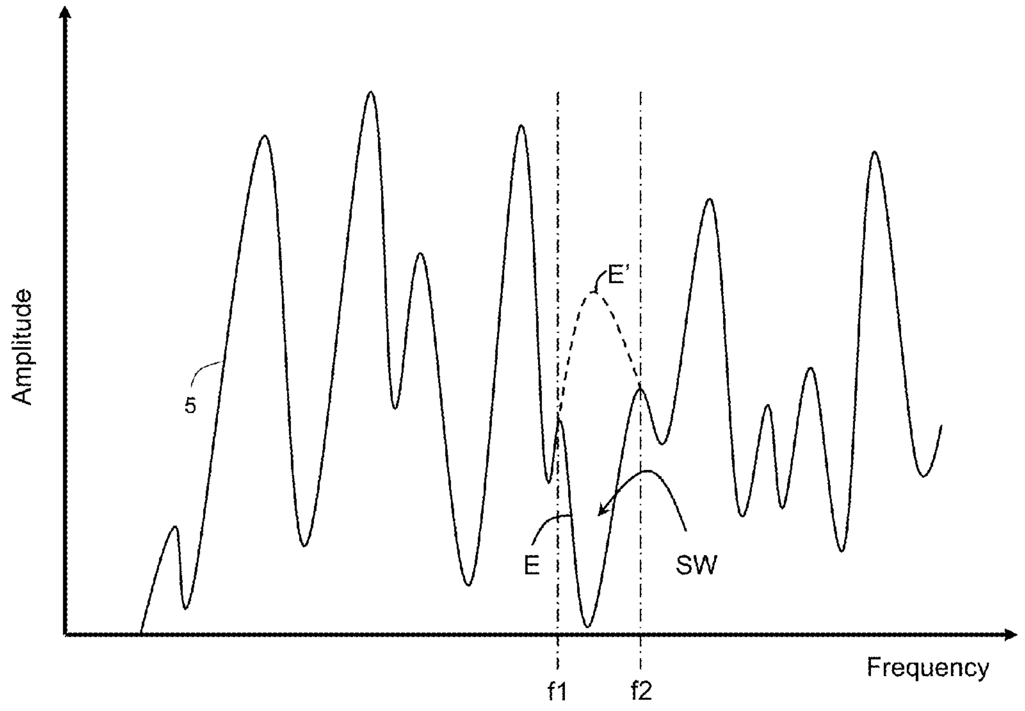
FIG. 5 illustrates an exemplary frequency domain representation of the audio signal at the time selected for insertion of the watermark.

FIG. 5 illustrates an exemplary frequency domain representation of the audio signal 5 at the time t1 selected for insertion of the watermark symbol. The exemplary frequency domain of FIG. 5 corresponds to that of FIG. 2 above except that in FIG. 5, in contrast with FIG. 2, a spectral well SW has been created in the frequency band between the frequencies f1 and f2. The curve labeled E' and shown dashed corresponds to that of FIG. 2 above, the curve prior to the creation of the spectral well SW. The curve labeled E and shown solid corresponds to the new curve in which the spectral well SW has been created. The spectral well SW corresponds to a reduction or attenuation of energy of the audio signal in the frequency band between the frequencies f1 and f2 beginning at the time determined for insertion of the watermark. In FIG. 5, a portion of the audio signal corresponding to the frequency range between the frequencies f1 and f2 has been removed.

Inserting the watermark in the time-frequency space corresponding to the frequency band between the frequencies f1 and f2 with its now-reduced energy level of the audio signal may increase the ability of the decoder to later effectively decode the watermark. There is not as much energy of the audio signal in the frequency band between the frequencies f1 and f2 now. The chances for detection of the watermark, once inserted in the frequency band between f1 and f2, have increased from the curve of FIG. 2 to the curve of FIG. 5.

Spectral Well—Creation/Enhancement

Figure 6:
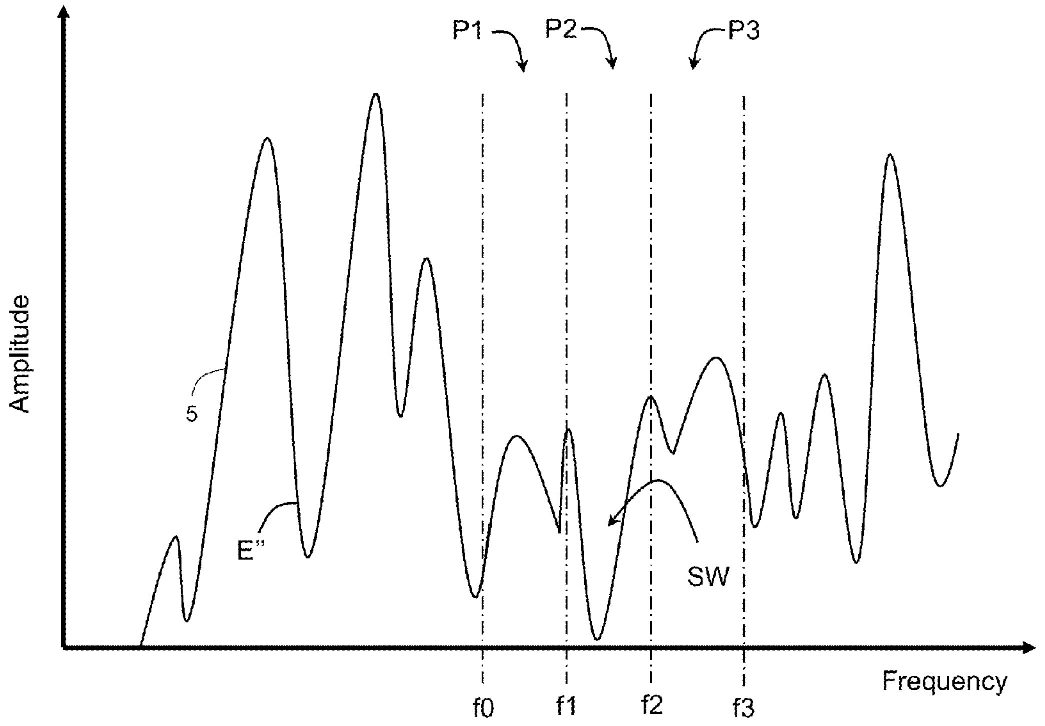
FIG. 6 illustrates an exemplary frequency domain representation of an audio signal at the time selected for insertion of the watermark symbol.

FIG. 6 illustrates an exemplary frequency domain representation of an audio signal 5 at a time t1 selected for insertion of the watermark symbol. The portion P2 between f1 and f2 may be a candidate for a spectral well as determined by the detection algorithm described above. However, the amplitude of the neighboring portions P1 and P3 shown in dashed lines is relatively low such that insertion of a watermark symbol of relatively high amplitude in the spectral well SW may be audibly noticeable. P2 includes a spectral well, just not a very good one.

Figure 7:
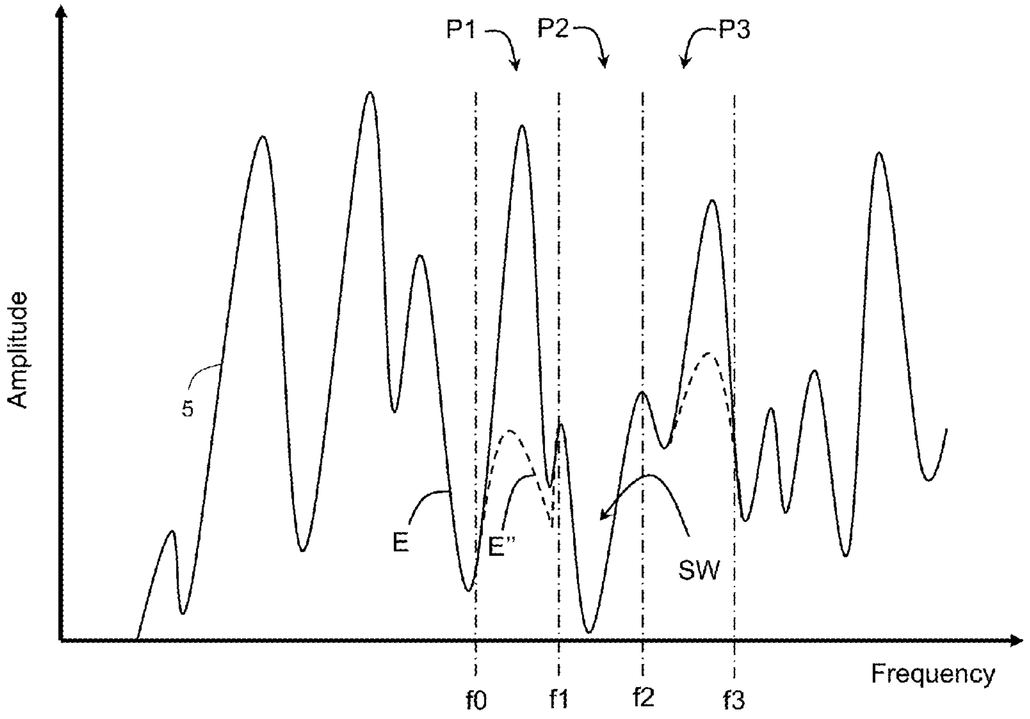
FIG. 7 illustrates the exemplary frequency domain representation of the audio signal of FIG. 6 with spectral portions of the audio signal amplified to create or enhance the spectral well.

FIG. 7 illustrates the exemplary frequency domain representation of the audio signal 5 at time t1 of FIG. 6 with spectral portions P1 and P3 of the audio signal 5 amplified to create or enhance the spectral well SW. In FIG. 7 the original curve E" shown in dashed line has been modified to amplify portions P1 and P3 resulting in the new curve E which exhibits a now well-defined spectral well SW in the spectral region P2 between f1 and f2. The spectral well SW is an ideal spectral well in which to insert a watermark symbol 51 at time t1.

Symbol Insertion

The watermark symbol S1 is to be inserted in a spectral channel. In one embodiment, a system may be implemented with a set number and locations of spectral channels. In another embodiment, the number and/or location of spectral channels may be dynamic. A system may be implemented in which the number and/or locations of spectral channels is determined based on the techniques described above to detect or create spectral wells. Portions of the audio signal in which spectral wells have been detected or created may become spectral channels.

Figure 8:
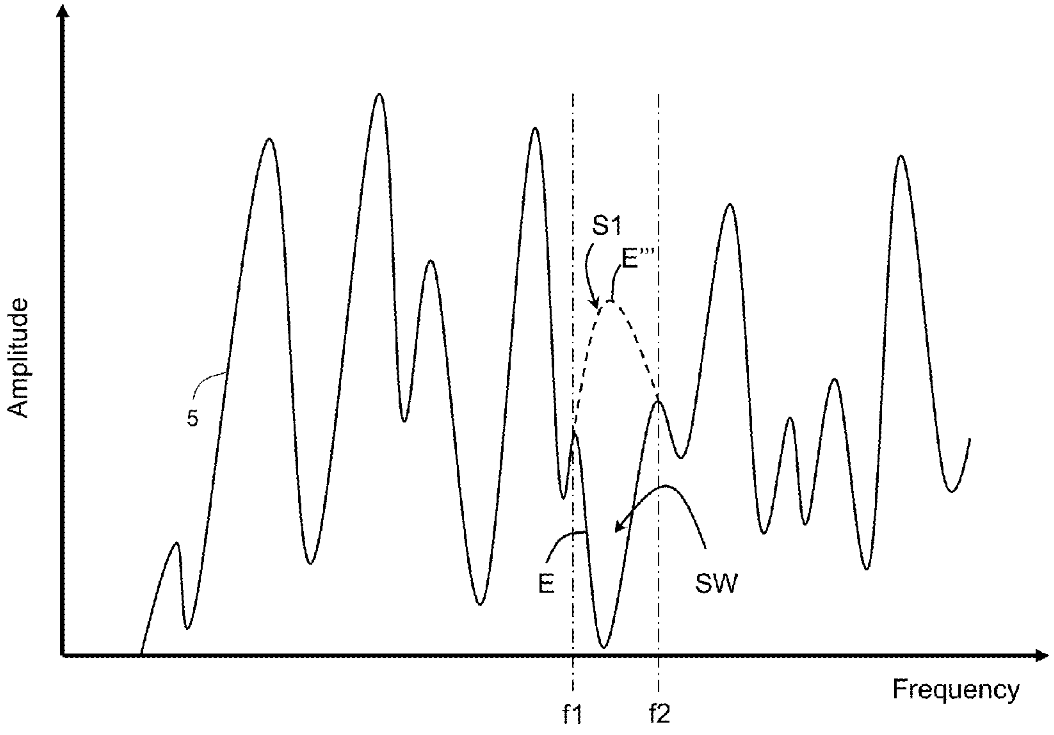
FIG. 8 illustrates an exemplary frequency domain representation of the audio signal in which the spectral well has been detected or created.

FIG. 8 illustrates the exemplary frequency domain representation of the audio signal 5 at time t1 in which the spectral well SW has been detected or created. In FIG. 8, the curve labeled E shown in solid line is the curve in which the spectral well SW was detected or created as in any of FIG. 3, 4, 5, or 7. The spectral well SW is an ideal spectral well in which to insert a watermark symbol S1 at time t1. In the curve labeled E''' shown in dashed line the watermark symbol S1 has been inserted. The algorithms for inserting a watermark symbol S1 will be explained in more detail below. The algorithms may include spectral replacement, perceptual fusion, perceptual masking, and combinations thereof.

Spectral Replacement

In returned reference to FIG. 5, in which the curve labeled E' and shown dashed is the curve prior to the creation of the spectral well SW and the curve labeled E and shown solid is the new curve in which the spectral well SW has been created, the algorithm for spectral replacement may include, prior to creating the spectral well SW, measuring amplitude of the portion of the original audio signal E' corresponding to the frequency range between f1 and f2 in which the watermark symbol S1 is to be inserted at the time interval beginning at time t1. This is so that the portion of the original audio signal may be replaced with a watermark symbol that resembles the replaced audio signal portion. Ideally, the watermarked audio will sound equivalent to the original, but the watermark symbol has enough structure (i.e., amplitude and spectral/temporal width) to be decoded. The algorithm may also include amplifying or attenuating amplitude of the symbol S1 to be inserted such that amplitude of the symbol approximates the amplitude of the portion of the original audio signal corresponding to the frequency range between f1 and f2 and the time interval beginning at time t1.

Amplitude of the portion of the original audio signal E' corresponding to the frequency range between f1 and f2 may be measured. The watermark symbol to be inserted in the spectral well about to be created may be amplified or attenuated to resemble the measured audio signal portion that is about to be removed. The algorithm for spectral replacement may then include removing the portion of the original audio signal E' corresponding to the first frequency range between f1 and f2 and the time interval beginning at time t1. In FIG. 5, the portion of the audio signal 5 corresponding to the frequency range between f1 and f2 has been removed in curve E shown in solid line to create the spectral well SW.

At time t1, the symbol S1 that was amplified or attenuated to resemble the removed audio signal portion may be inserted in the spectral channel of the audio signal corresponding to the frequency range between f1 and f2 (i.e., in the spectral well SW) to replace the removed audio signal portion. In FIG. 8, the amplified or attenuated amplitude watermark symbol S1 has been inserted in curve E''' shown in dashed line to replace the portion of the audio signal corresponding to the frequency range between f1 and f2. As shown in FIG. 8, the resulting watermarked audio signal E''' may resemble or look similar to the original audio signal E' of FIG. 5. Since the signal E''' resembles the original audio signal E' audibility of the inserted watermark symbol is minimized.

Spectral Fusion

The algorithm for spectral fusion may involve calculating the amplitude of the watermarked symbol to be inserted based on the adjacent frequency portions so that perception of the newly inserted watermark symbol fuses with the neighboring portions of the audio signal.

Figure 9:
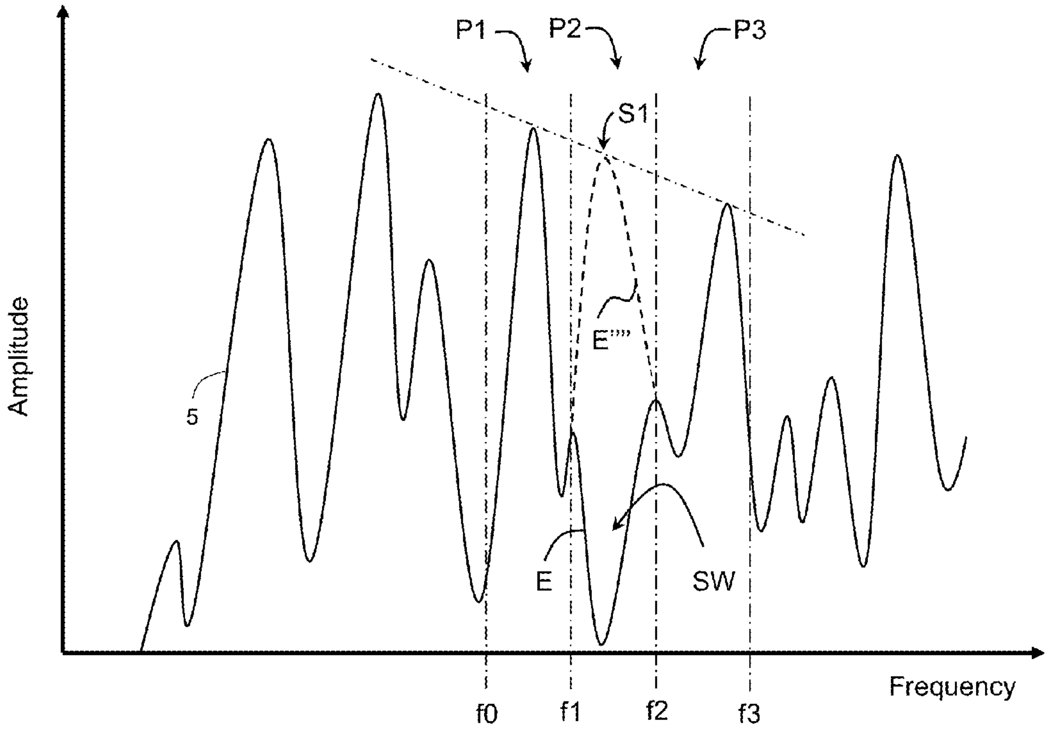
FIG. 9 illustrates the exemplary frequency domain representation of the audio signal with a symbol inserted in a spectral channel.

FIG. 9 illustrates the exemplary frequency domain representation of the audio signal 5 at time t1 of FIG. 8 with a symbol S1 inserted in the spectral channel P2 between f1 and f2. Amplitude of the symbol S1 was calculated to be an average between the amplitude measured for the adjacent portions P1 and P3. The curve E shown in solid line includes the spectral well SW. The curve E'''' shown in dashed line illustrates the symbol S1 inserted in the spectral channel P2. Amplitude of the symbol S1 is such that perception of the newly inserted watermark symbol S1 in the spectral channel P2 should fuse in the vicinity of the portions P1 and P3 of the audio signal.

The algorithm for spectral fusion may also involve creating or enhancing a spectral well as disclosed above. The inserted watermark symbol should fuse with the speech. To the ear it sounds as if it were still part of the speech signal even though it wasn't in the original.

Perceptual Masking

If a spectral well is like a valley, perceptual masking is like a mountain.

Figure 10:
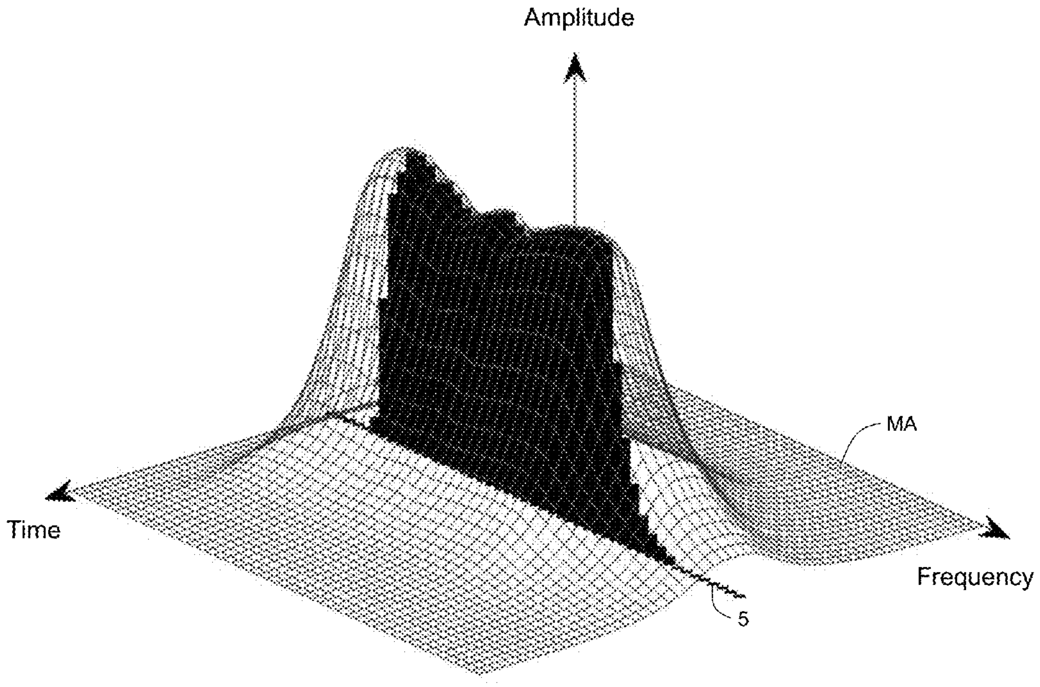
FIG. 10 illustrates an exemplary relationship between time-frequency spectra of a program's audio signal and a corresponding masking algorithm.

FIG. 10 illustrates an exemplary relationship between time-frequency spectra of a program's audio signal 5 and a corresponding masking algorithm MA. The figure shows a hypothetical segment of audio 5 as a vertical block of energy and a hashed masking envelope MA below which other audio components are inaudible. Under the envelope MA, other audio components at the appropriate time and frequency will be inaudible. The program's audio signal 5 is represented as the vertical rectangular block with a well-defined start and stop time, as well as a high and low frequency. The corresponding masking curve MA in the same time-frequency representation determines the maximum added watermark energy that will not be audible. Masking is represented by the envelope grid MA, under which the human ear cannot detect a signal.

Figure 11:
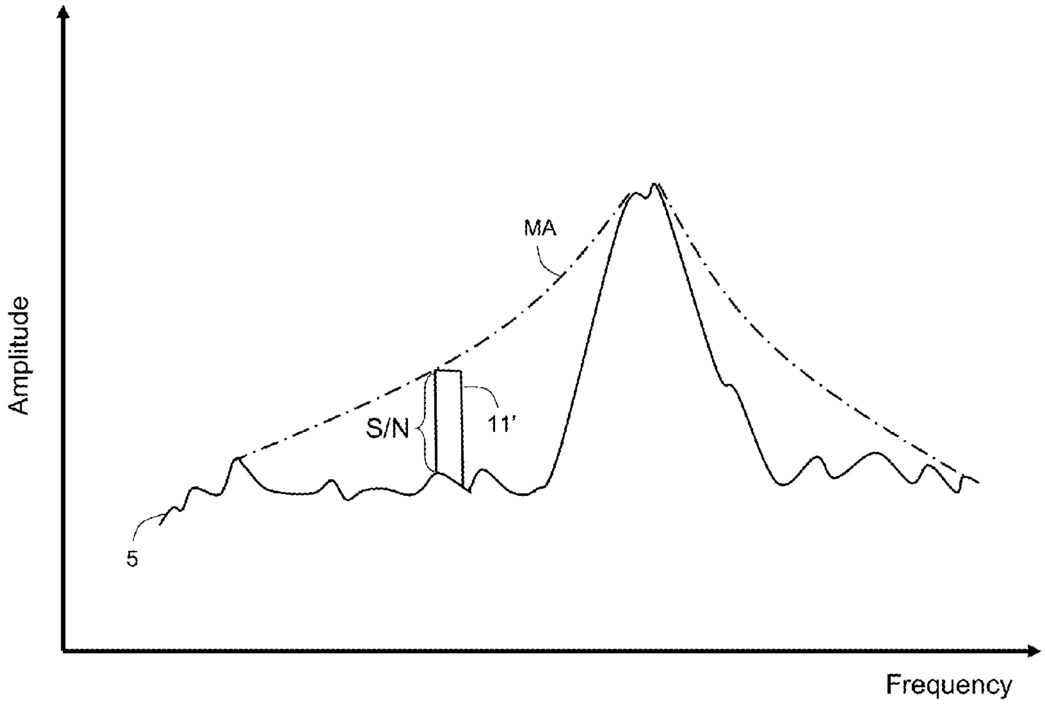
FIG. 11 illustrates an exemplary frequency domain representation of the audio signal.

FIG. 11 illustrates an exemplary frequency domain representation of the audio signal 5 at the time t1 selected for insertion of the watermark symbol S1 and how the effective S/N of the watermark symbol S1 may be determined. The maximum level of the watermark symbol S1 injectable at a time-frequency is determined by the masker 6 based on the masking algorithm MA, while the "noise" in the S/N corresponds to the energy of the program's audio signal 5 at the same time-frequency. The energy of the program's audio signal 5 both enables the watermark symbol S1 to be injected and it also degrades the watermark symbol S1 with additive "noise."

Figure 12:
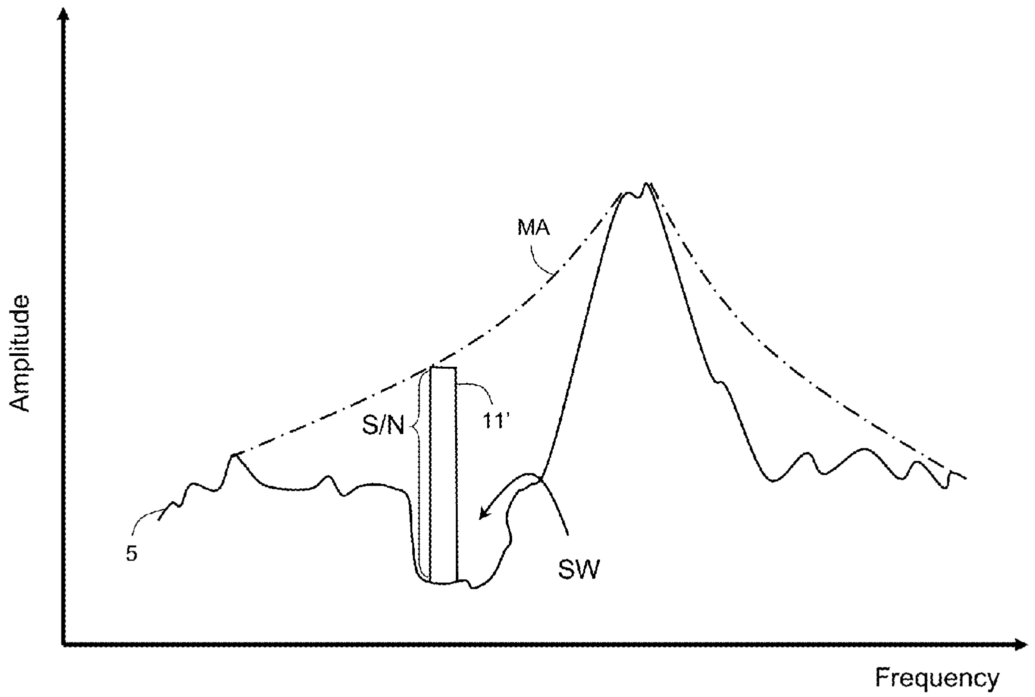
FIG. 12 illustrates an exemplary frequency domain representation of the audio signal.

FIG. 12 illustrates an exemplary frequency domain representation of the audio signal 5 at the time selected for insertion of the watermark symbol S1 and how the creation of a spectral well SW under the watermarking component increases the S/N of the watermark symbol S1 as seen by the decoder. If the needed S/N is achieved without creating or enhancing a spectral well (e.g., a natural spectral well was detected), the spectral well SW may not need to be created. However, if the S/N is not adequate, for example 3 dB, a spectral well of, for example, an additional 3 dB may be created to get to an adequate S/N of, for example, 6 dB. Thus, a threshold or target S/N may control the creation of the spectral well SW on an as needed basis with the required depth to achieve the target S/N.

Figure 13:
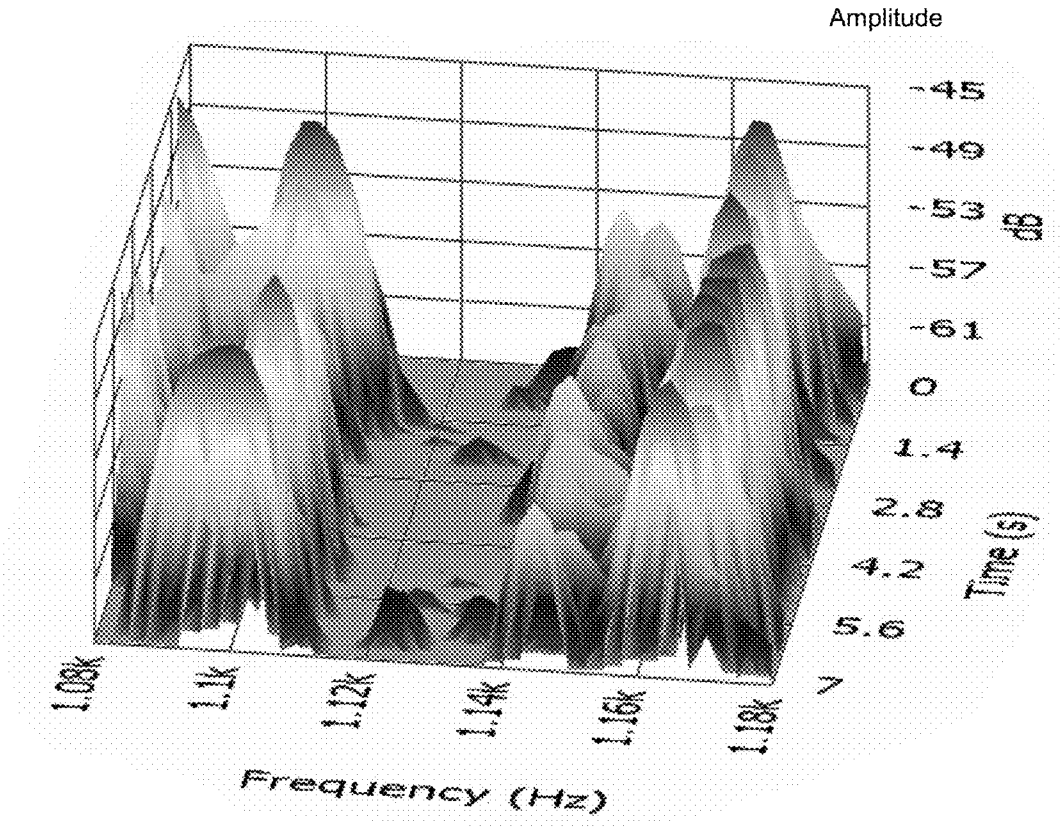
FIG. 13 illustrates a typical segment of music, in this case an organ solo, with a natural spectral well that requires no additional processing.

FIG. 13 illustrates a typical segment of music, in this case an organ solo, with a natural spectral well that requires no additional processing. The spectral region between 1.15 kHz and 1.14 kHz, which is between two overtones of the organ note, is an ideal natural spectral well that is part of this piece of music.

Figure 14:
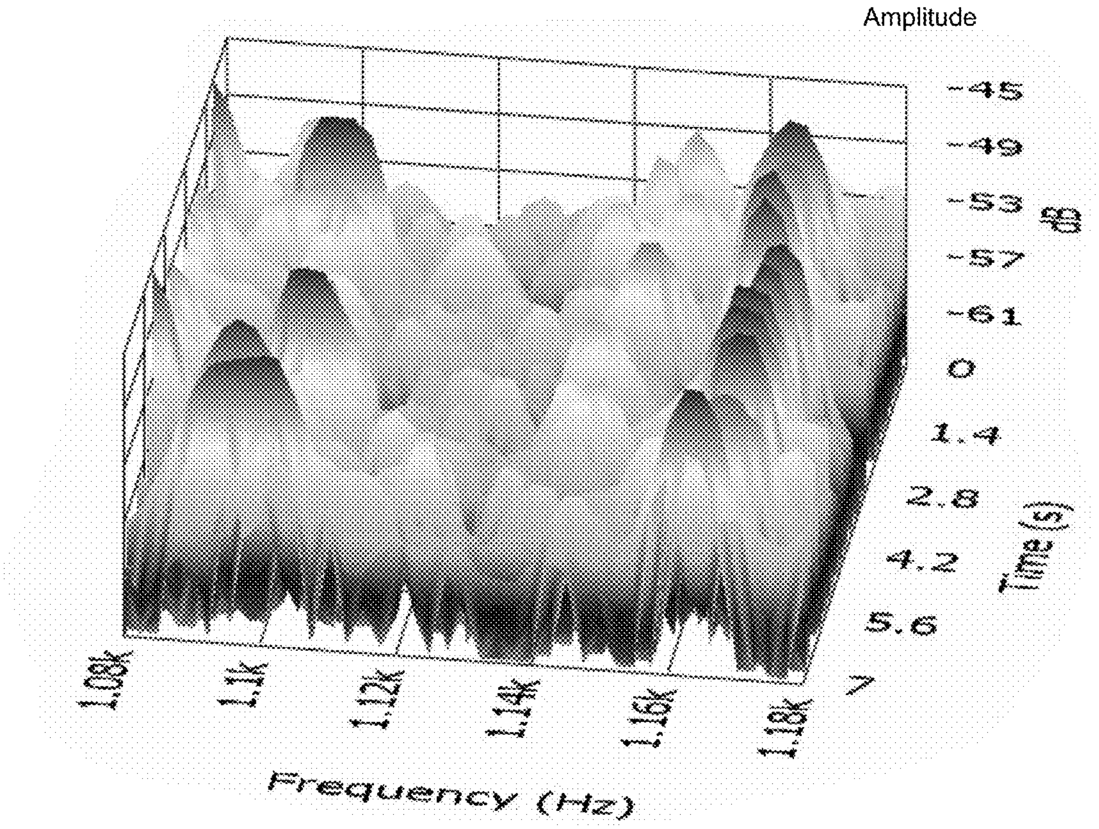
FIG. 14 illustrates a more typical piece of music, in this case the same organ note but with an accompanying orchestra that fills in the spectral well.

FIG. 14 illustrates a more typical piece of music, in this case the same organ note but with an accompanying orchestra that fills in the spectral well. Without additional processing, the S/N of the watermark would be insufficient for the decoder to detect or decode the watermark signal even though the watermark signal's peak energy is the same as that for FIG. 13.

Figure 15:
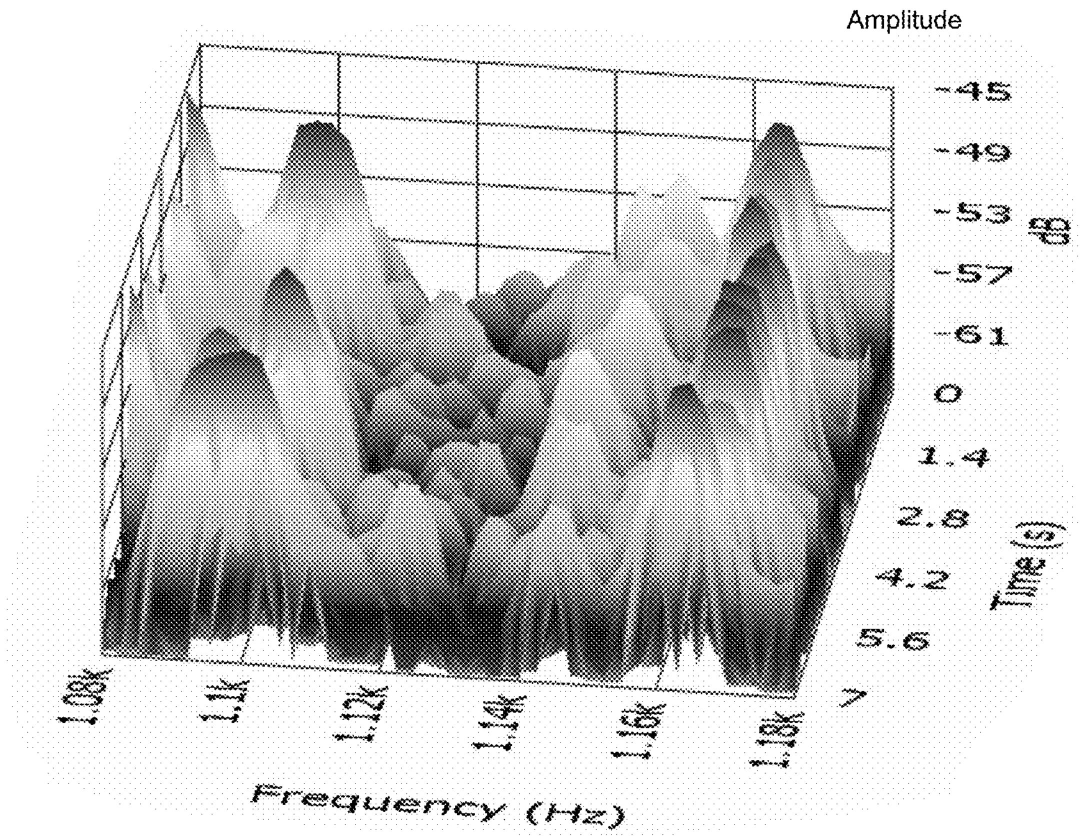
FIG. 15 illustrates the time-frequency spectrum of FIG. 14 but with the additional spectral well processing.

FIG. 15 illustrates the time-frequency spectrum of FIG. 14 but with the additional spectral well processing. The S/N of the watermarking for this case is more than 6 dB. The spectral well could be made deeper and eventually could approach the time-frequency spectrum of FIG. 13.

Figure 16:
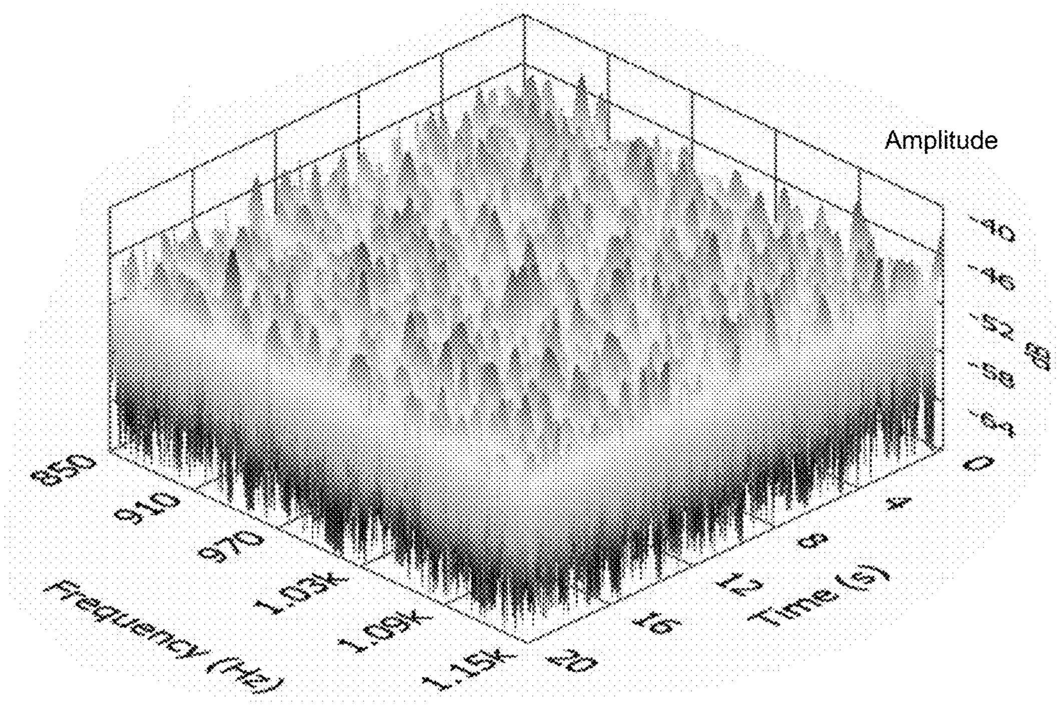
FIG. 16 illustrates a time-frequency spectrum of a music segment with no natural spectral wells.

FIG. 16 illustrates a time-frequency spectrum of a music segment with no natural spectral wells. If watermarking has to be injected, the spectral well needs to be created.

Figure 17:
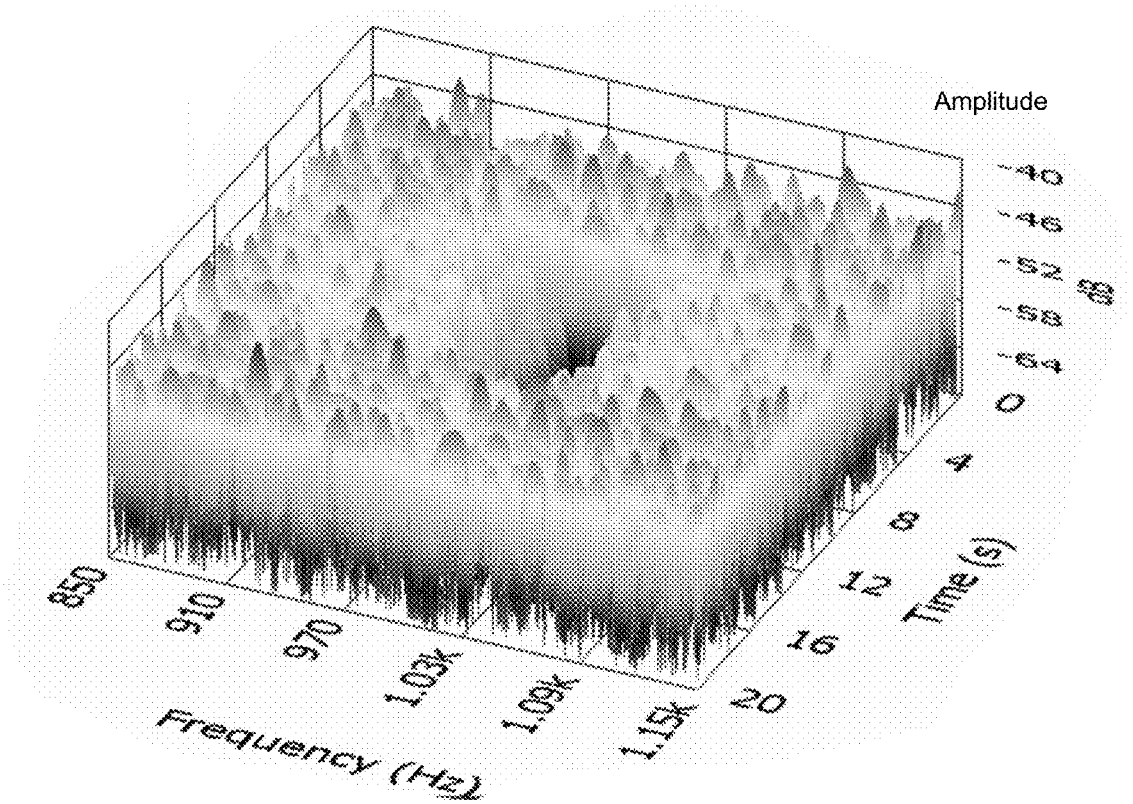
FIG. 17 illustrates the spectrum of FIG. 16 after a spectral well has been created between 5 and 10 seconds and between 0.99 kHz and 1.05 kHz.

FIG. 17 illustrates the spectrum of FIG. 16 after a spectral well has been created between 5 and 10 seconds and between 0.99 kHz and 1.05 kHz.

Figure 18:
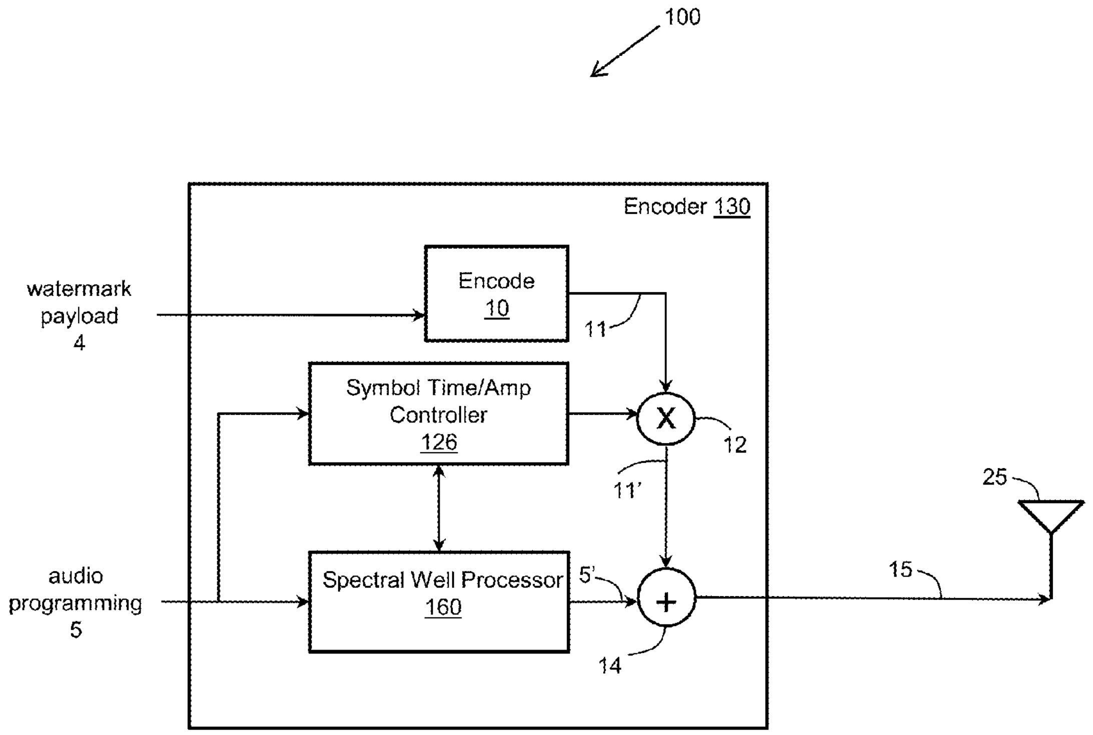
FIG. 18 illustrates a simplified block diagram of an exemplary system for electronic watermarking.

FIG. 18 illustrates a simplified block diagram of an exemplary system 100 for electronic watermarking. The system 100 includes the encoder 130, which may include the encode 10. The system 100 also includes the symbol time/amp controller 126 and the spectral well processor 160.

The encode 10, as in FIG. 1, receives the watermark payload 4 including, for example, a radio station identification, the time of day, etc. and encodes it to produce the watermark signal 11. The encode 10 encodes this information in possibly an analog signal that will be added to the audio programming 5 someplace in the transmitter chain. The encode 10 may also modify the watermark signal (watermark modifier) to modulate the watermark signal with a carrier frequency in the frequency range at which the watermark is to be embedded onto the audio programming signal 5.

The symbol time/amp controller 126 receives the audio programming signal 5 and analyses it as described above to determine, for example, the timing or the energy at which the watermark signal 11 will be broadcasted (i.e., the timing or the amplitude of the symbol S1). The output of the symbol time/amp controller 126 is provided to the multiplier 12 and its output is the adjusted watermarking 11' which includes the symbol S1.

The encoder 130 also includes spectral well processor 160 that receives the audio programming signal 5 and detects whether a spectral well exists beginning at the time t1 indicated by the symbol time/amp controller 126 for insertion of the symbol S1. When necessary, the spectral well processor 160 creates a spectral well on the audio signal 5 by removing a portion, enhancing portion(s), or both of the audio signal 5 as described above. The spectral well processor 160 may receive information from the symbol time/amp controller 126 as to the timing or frequency band of the audio signal 5 that the symbol time/amp controller 126 has selected for insertion of the watermark symbol S1. Based on that information, the spectral well processor 160 may create a spectral well at the time t1 of the audio signal 5 resulting on a modified audio signal 5'.

The symbol time/amp controller 126 like the masker 6 of FIG. 1 may, in some embodiments, take advantage of perceptual masking of the host audio signal 5 to hide the watermark as described above. In some embodiments, perceptual masking of the host audio signal 5 is not used or is used in addition to some of the other algorithms (e.g., spectral replacement, spectral fusion, etc.) described above to hide the watermark symbol S1. In the case of spectral replacement, for example, at least one of the symbol time/amp controller 126 and the spectral well processor 160 measures amplitude of the spectral portion to be attenuated (i.e., to create the spectral well) and replaced. Based on that measurement, the symbol time/amp controller 126 controls the amplitude of the symbol S1. In the case of spectral fusion, the symbol time/amp controller 126 measures the neighboring spectral portions of the spectral portion in which the spectral well exists and, based on that measurement, controls the amplitude of the symbol S1. In other embodiments, perceptual masking of the host audio signal 5 may be used to determine only amplitude of the adjusted watermarking 11' which includes the symbol S1 while timing is fixed or determined differently.

The summer or watermark inserter 14 receives the modified audio signal 5' and embeds the adjusted watermarking signal 11' onto the modified audio signal 5'. The watermark signal 11' (i.e., the symbol S1) is effectively embedded in the spectral well by the watermark inserter 14 superimposing the adjusted watermark signal 11' onto the audio signal 5' beginning at time t1. The result is the output signal 15, which includes the information in the audio programming signal 5' and the adjusted watermarking signal 11'. The modulator/transmitter 25 at the station broadcasts the transmission, which includes the information in the output signal 15, through the air, internet, satellite, etc.

In the field (not shown) an AM/FM radio, television, etc. that includes a receiver, a demodulator, and a speaker may receive, demodulate and reproduce the output signal 15. A decoder may receive and decode the reproduced signal to, hopefully, obtain the watermark or the information within the watermark. However, since the S/N of the watermark signal 11' has been significantly increased due to the detection, creation or enhancement of the spectral well on the audio signal 5', the chances of the watermark being detected have increased.

Figure 19:
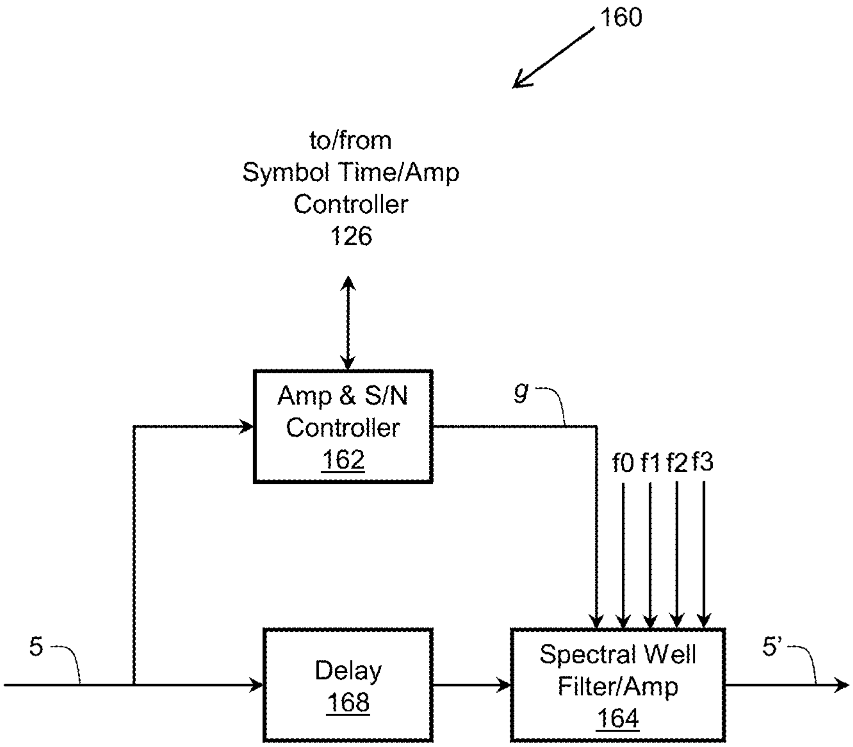
FIG. 19 illustrates a block diagram of an exemplary spectral well processor.

FIG. 19 illustrates a block diagram of an exemplary spectral well processor 160, which includes an amplitude and S/N controller 162 that receives the audio signal 5. Prior to the spectral well processor 160 creating the spectral well on the audio signal 5, if necessary, the amplitude and S/N controller 162 may determine the amplitude of the audio signal 5 or the S/N of the watermark signal 11' to the audio signal 5 in a frequency range at the time the watermark symbol is to be inserted.

In one embodiment, the amplitude and S/N controller 162 resides within the spectral well processor 160 as shown in FIG. 19. In another embodiment, the spectral well processor 160 and the amplitude and S/N controller 162 may receive information from the symbol time/amp controller 126 indicative of the amplitude of the portion of the audio signal 5 corresponding to the time and/or frequency range where the watermark is to be inserted. The amplitude and S/N controller 162 may include a volt meter, group of voltmeters or similar structure that may determine (e.g., measure) the amplitude of the watermark signal 11' and the audio signal 5 and compares them.

From the amplitude or S/N information, the amplitude and S/N controller 162 may determine whether a natural spectral well exists or whether a spectral well must be created as described above.

In the illustrated embodiment of FIG. 19, the spectral well processor 160 includes a spectral well filter/amp 164 with start and ending frequencies (for example, f1 and f2 of FIG. 5 and/or f0, f1, f2, and f3 of FIG. 7), which may be fixed or dynamically selected. The lower and upper frequencies, f1 and f2 respectively, may correspond to frequencies that define the frequency band P2 in which the watermark is to be inserted. The audio signal 5 may be passed through the filter/amp 164 beginning at the time t1 of the audio signal 5 that the watermark is to be inserted. This creates the spectral well on the audio signal 5' by attenuating (e.g., filtering) the portion P2 of the audio signal 5 as shown in FIG. 5 or by enhancing (i.e., amplifying) the neighboring portions (P1 between f0 and f1) and (P3 between f2 and f3) as described above in reference to FIG. 5.

Figure 20:
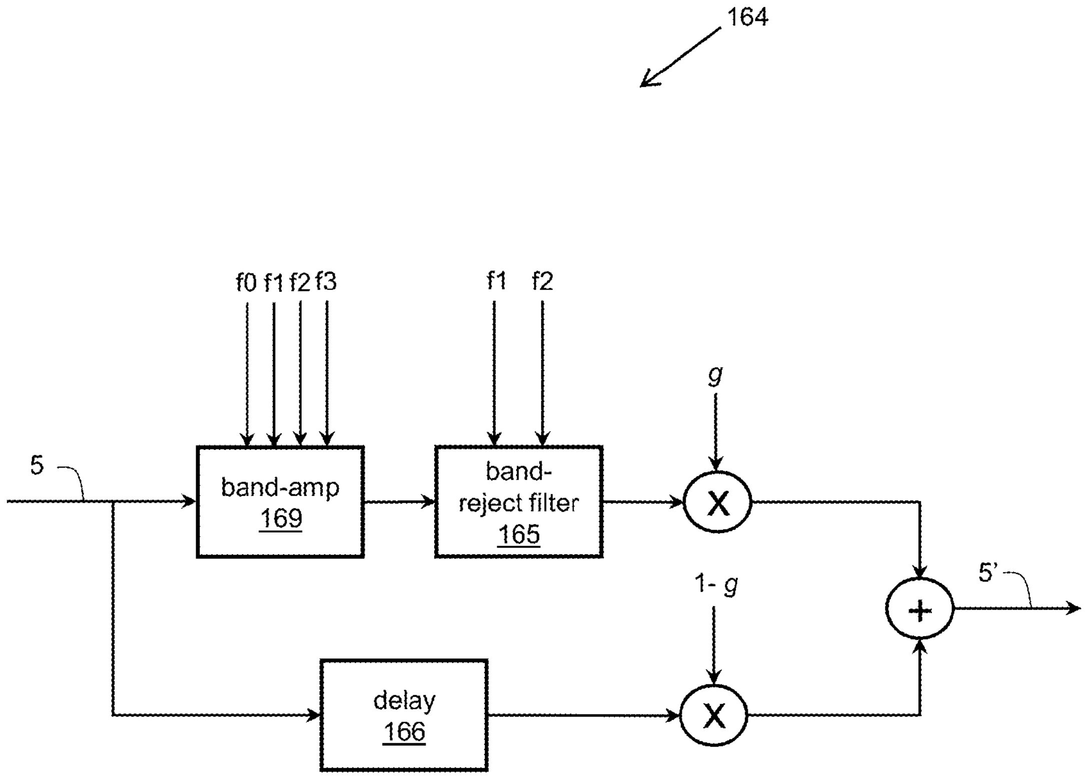
FIG. 20 illustrates a block diagram of an exemplary implementation of a spectral well filter/amp.

FIG. 20 illustrates a block diagram of an exemplary implementation of the spectral well filter/amp 164, which includes a band-stop or band-reject filter 165 and a band amplifier 169. Assuming that the filter 165 and/or the amp 169 were implemented with an FIR architecture having fixed delay at all frequencies, the depth of the spectral well is determined by constant g, which is a cross fading between g=0 (no well) and g=1 (maximum well depth). The filter/amp 164 may include an extra delay 166 that introduces a delay equal (or roughly equal) to the known, fixed delay of the filter 165 and/or the amp 169. Since the delays in the filter 165 and/or the amp 169 and the extra delay 166 are the same (or approximately the same), cross fading has no phase issues. In another embodiment, a single filter can be used with dynamic control of depth or a single amp can be used with dynamic control of height of neighboring spectral portions.

Returning to FIG. 19, in the illustrated embodiment, the spectral well processor 160 includes a look ahead delay 168 that is used so that the spectral well processor 160 may operate as a predictor. That is, the amplitude and S/N controller 162 may make decisions as to whether to create the spectral well or as to the depth of the spectral well or height of neighboring spectral portions on the basis of audio yet to arrive to the filter/amp 164. The S/N controller 162 may survey the time-frequency landscape (such as that of FIG. 16) and make decisions as to the temporal and/or spectral location and width of the spectral well.

Thus, in one embodiment, based on the information regarding the amplitude of the portion of the audio signal 5 corresponding to the time and frequency range where the watermark is to be inserted, the amplitude and S/N controller 162 (and thus the spectral well processor 160) may make decisions as to whether to create the spectral well on the audio signal 5. For example, if the amplitude of the portion of the audio signal corresponding to the time and frequency range where the watermark is to be inserted exceeds a certain threshold, the amplitude and S/N controller 162 (and thus the spectral well processor 160) may proceed with creating the spectral well. If the amplitude of the portion of the audio signal corresponding to the time and frequency range where the watermark is to be inserted does not exceed the threshold, the amplitude and S/N controller 162 (and thus the spectral well processor 160) may skip creating the spectral well. It may be that energy of the audio signal 5 at the time and frequency range where the watermark is to be inserted is already low enough that creation of the spectral well would not provide sufficient, measurable or justifiable improvements in detectability.

The embodiment of FIG. 19 is merely exemplary and there are any number of embodiments that may vary based on the application needs, some of which will be explained below.

In one embodiment, the amplitude and S/N controller 162 looks at the incoming audio program signal 5 and determines the degree to which each of the watermarking channels has a natural spectral well as discussed above. That is, the amplitude and S/N controller 162 determines the amplitude of the audio signal 5 and then, based on the watermarking amplitude that fits under the masking curve as received from the symbol time/amp controller 126, calculates the resulting S/N. If that ratio is adequate (i.e., above a threshold), no well may need to be created. If not adequate (i.e., below a threshold), the amplitude and S/N controller 162 determines the depth of the spectral well to achieve the threshold or target S/N.

Figure 21:
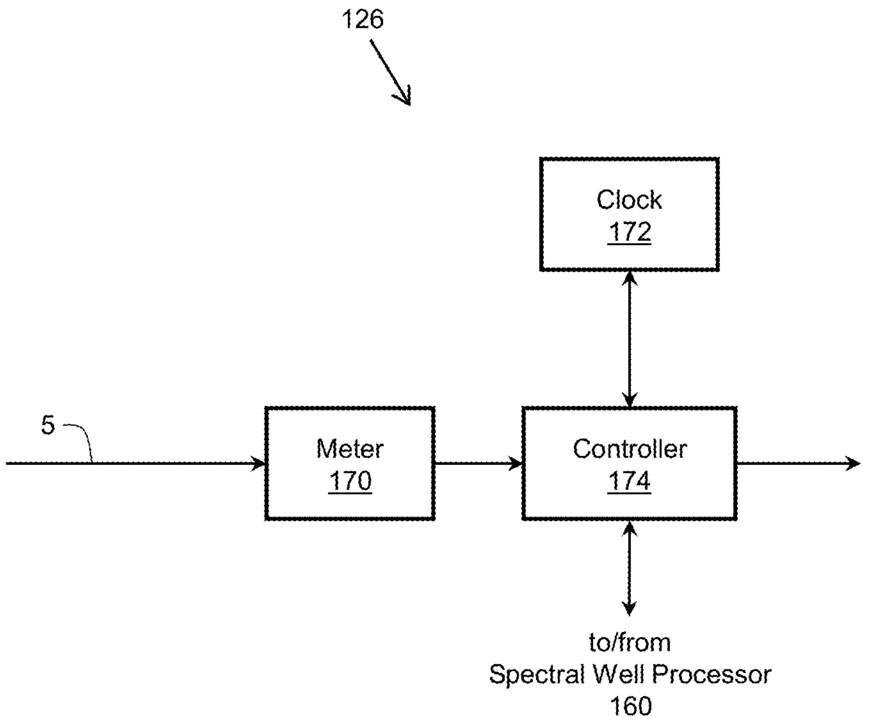
FIG. 21 illustrates a block diagram of an exemplary symbol time/amp controller.

FIG. 21 illustrates a block diagram of an exemplary symbol time/amp controller 126, which includes a meter 170, a clock 172 and a controller 174. The meter 170 receives and measures the audio programming signal 5. The controller 174 analyses the measurements as described above to determine, for example, the timing or the energy at which the watermark signal 11 will be broadcasted (i.e., the timing or the amplitude of the symbol S1).

The controller 174 like the masker 6 of FIG. 1 may, in some embodiments, take advantage of perceptual masking of the host audio signal 5 to hide the watermark symbols as described above. In some cases the controller 174 may use perceptual masking of the host audio signal 5 to determine timing and amplitude of the symbol S1 to be inserted. In some embodiments, the controller 174 does not use of perceptual masking of the host audio signal 5 (e.g., spectral replacement). In other cases, the controller 174 may use perceptual masking of the host audio signal 5 to determine only amplitude of the symbol S1 to be inserted. In cases where the controller 174 does not use perceptual masking of the host audio signal 5 to determine the time t1 at which the symbol S1 is to be inserted, the clock 172 may provide the timing.

As described above, an audio program may be sufficiently uniform in time and frequency that there are no dominant components to hide a watermark symbol. In this case, adding watermarking or creating a spectral well are likely to be audible. However, if the energy removed by the spectral well and the energy added by the watermarking are approximately equal and if the well duration is approximately the same as the watermark duration, the net effect in audibility is minimal. In one embodiment, the symbol time/amp controller 126 controls the watermark signal 11 to replace (i.e., spectral replacement) a piece of program audio signal removed to create a spectral well with a similar watermark piece. Ideally, the watermarked audio will sound equivalent to the original but the watermark has enough structure to be decoded.

Thus, in one embodiment, the spectral well processor 160 and the symbol time/amp controller 126 communicate and work in concert such that amplitude of the adjusted watermark signal 11' approximates the amplitude of the portion of the audio signal 5 removed by the spectral well processor 160 to create the spectral well in modified audio signal 5'. The meter 170 may measure amplitude of the spectral portion to be removed (i.e., to create the spectral well) and replaced, and, based on that measurement, the controller 174 controls the amplitude of the symbol S1. The result of this modification is that the resulting output audio signal 15 will resemble or look similar to the original audio signal 5 because the watermark signal 11' (having an amplitude that approximates the amplitude of the portion of the audio signal 5 removed by the spectral well processor 160) takes the place of the removed portion.

In the case of spectral fusion, the meter 170 may measure neighboring spectral portions of the spectral portion in which the spectral well exists and, based on that measurement, the controller 174 controls the amplitude of the symbol S1.

Example methods may be better appreciated with reference to the flow diagrams of FIGS. 22-27. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 22:
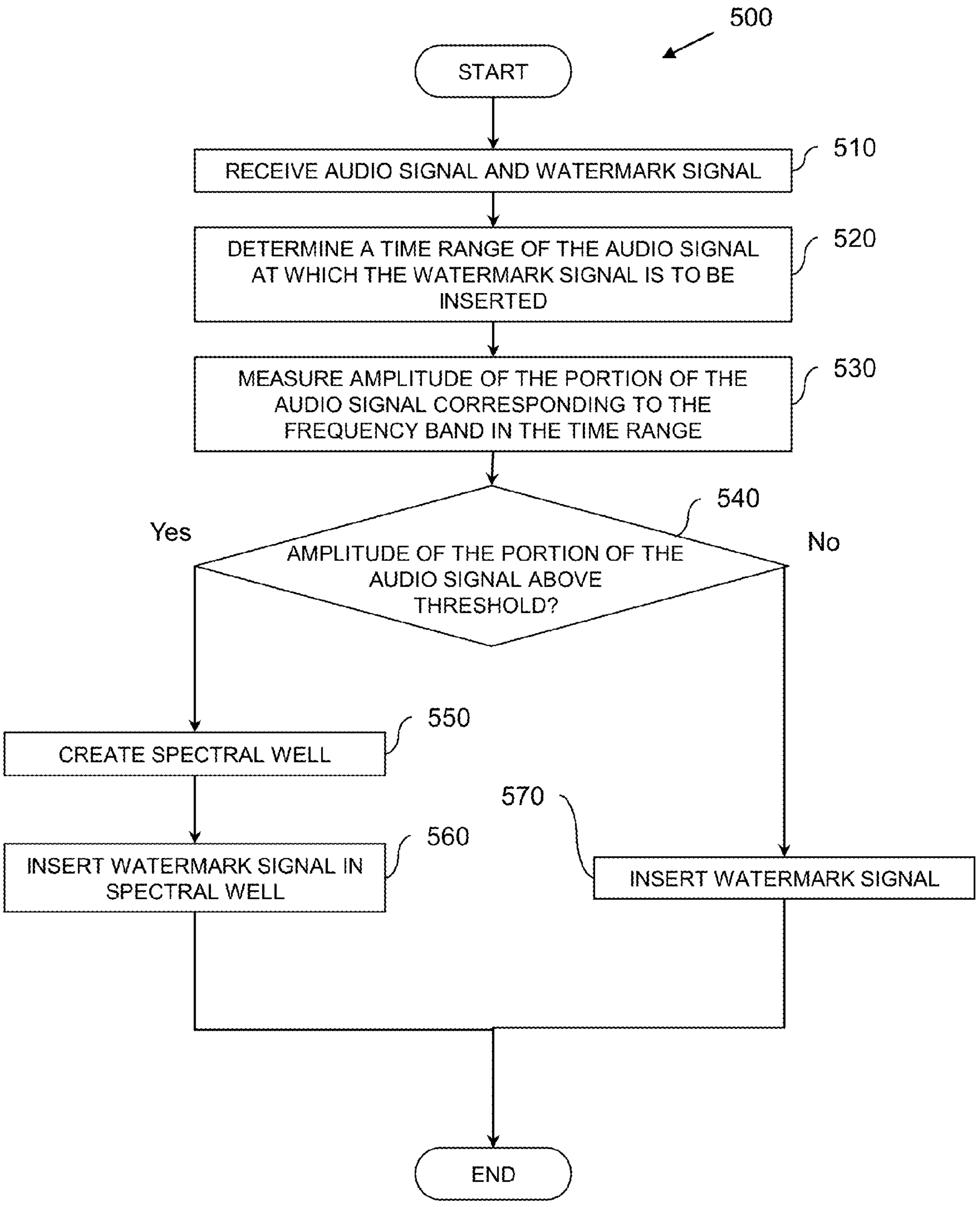
FIG. 22 illustrates a flow diagram for an example method for a machine or group of machines to watermark an audio signal.

FIG. 22 illustrates a flow diagram for an example method 500 for a machine or group of machines to watermark an audio signal. In the embodiment of FIG. 22, the spectral channels (i.e., the frequencies of the audio signal 5 at which the watermark symbol S1 is to be inserted) are fixed. At 510 the method 500 includes receiving an audio signal and a watermark signal. At 520, the method 500 determines a time range of the audio signal at which the watermark signal is to be inserted. The watermark encoding method may take advantage of perceptual masking of the host audio signal to hide the watermark and thus may determine the time range based on perceptual masking capability of the audio signal, for example.

At 530, the method 500 includes measuring the amplitude of a portion of the audio signal corresponding to the frequency band and the time range determined for the watermark to be inserted in the audio signal.

At 540, if the amplitude of the portion of the audio signal corresponding to the frequency band and the time range determined for the watermark to be inserted in the audio signal is higher than a threshold, at 550, the method 500 creates a spectral well as disclosed above. At 560, the method 500 inserts the watermark signal in the spectral well.

On the other hand, at 540, if the amplitude of the portion of the audio signal corresponding to the frequency band and the time range determined for the watermark to be inserted in the audio signal is not higher than the threshold, at 570, the method 500 inserts the watermark signal in the audio signal without creating a spectral well.

In one embodiment, the method 500 includes measuring the S/N of the watermarking signal to the audio signal corresponding to the frequency band and the time range determined for the watermark to be inserted in the audio signal. If the S/N is lower than a threshold, the method 500 creates a spectral well as disclosed above. On the other hand, if the S/N is at or higher than the threshold, the method 500 inserts the watermark signal in the audio signal without creating a spectral well.

In some embodiments, the method 500 may modify the amplitude of the watermark signal such that it approximates the amplitude of the portion of the audio signal removed to create the spectral well. The result of this is that the resulting output audio signal will resemble or look similar to the original audio signal because the watermark signal (having an amplitude that approximates the amplitude of the portion of the audio signal removed to create the spectral well) takes the place of the removed portion.

Figure 23:
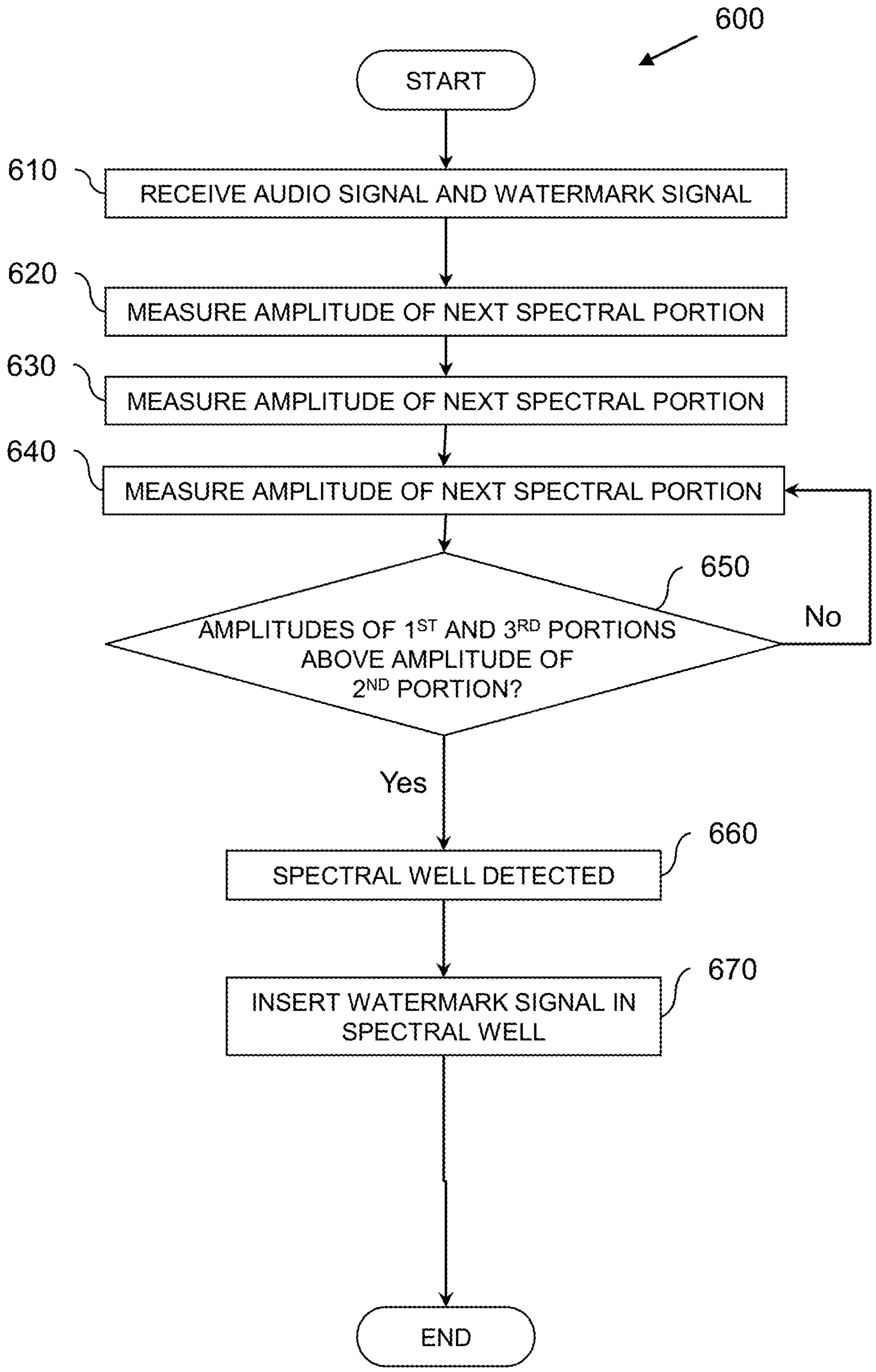
FIG. 23 illustrates a flow diagram for an example method for a machine or group of machines to watermark an audio signal.

FIG. 23 illustrates a flow diagram for an example method 600 for a machine or group of machines to watermark an audio signal. In the embodiment of FIG. 23, the spectral channels (i.e., the frequencies of the audio signal 5 at which the watermark symbol S1 is to be inserted) are not fixed. At 610 the method 600 receives the audio signal 5 and the watermark signal 4. At 620, 630, and 640 the method 600 includes measuring amplitude of three spectral portions of the audio signal 5. The three spectral portions measured include a first portion P1 corresponding to a first frequency range between f0 and f1 a second portion P2 corresponding to a second frequency range between f1 and f2, and a third portion P3 corresponding to a third frequency range between f2 and f3. At 650, when the amplitude of the first portion P1 and the amplitude of the third portion P3 exceed the amplitude of the second portion P2, at 660, the second portion P2 may be identified as including a spectral well. At 670, a watermark symbol may then be inserted in the identified spectral well of the audio signal corresponding to the second portion P2.

The algorithm for identifying a spectral well may involve continuously measuring portions of the audio signal (i.e., P1, P2, P3 . . . , Pn) until a spectral well is identified. Thus, when the amplitude of the first portion P1 and the amplitude of the third portion P3 do not exceed the amplitude of the second portion P2, at 640, the next spectral portion is measured. What constitutes a proper portion of the audio signal for measurement may be determined based on the frequency location and/or prescribed bandwidth and/or time duration of a spectral channel at that frequency location. The portions P1, P2, and P3 may be selected so that the corresponding bandwidths f0 to f1, f1 to f2, and f2 to f3, respectively, are of that determined certain bandwidth.

In cases where the spectral well does not exist, one could create the spectral well by, for example, removing a spectral portion of the audio signal 5, by increasing the intensity of neighboring portions, or both.

Figure 24:
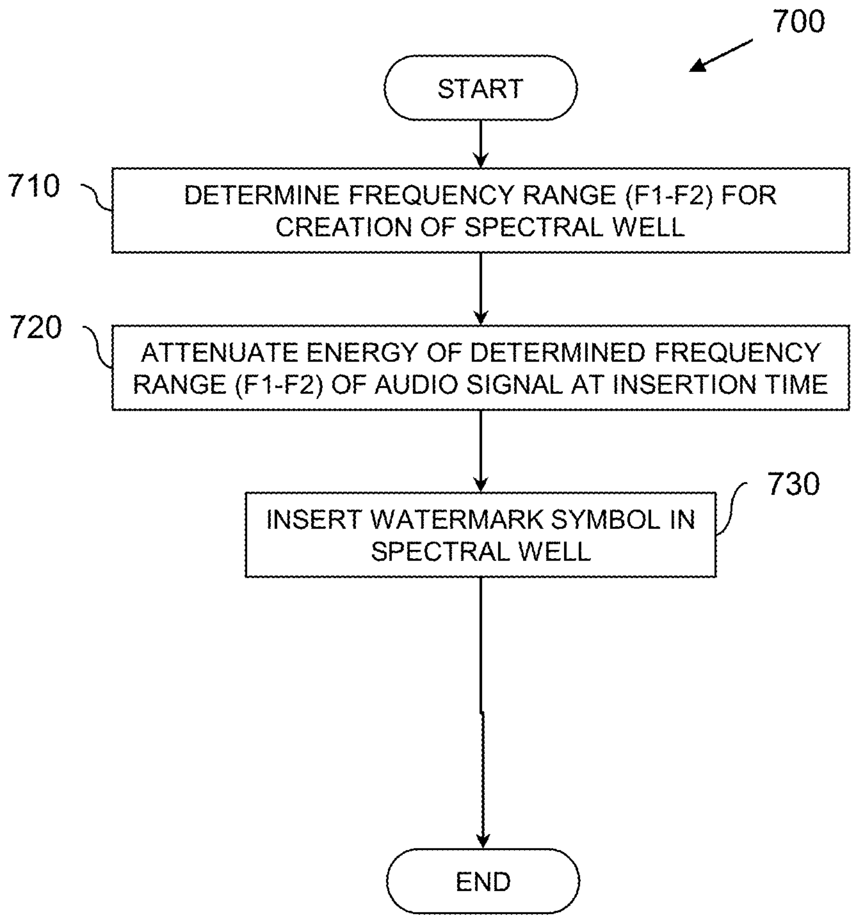
FIG. 24 illustrates a flow diagram for an example method for a machine or group of machines to watermark an audio signal.

FIG. 24 illustrates a flow diagram for an example method 700 for a machine or group of machines to watermark an audio signal. At 710, the method 700 determines a frequency range (i.e., spectral channel) at which to create the spectral well. Creating a spectral well corresponds to a reduction or attenuation of energy of the audio signal in the frequency band between the frequencies f1 and f2 at the time determined for insertion of the watermark symbol. Therefore, at 720, the portion of the audio signal corresponding to the frequency range between the frequencies f1 and f2 is attenuated (i.e., at least substantially removed) beginning at the time determined for insertion of the watermark symbol.

Inserting the watermark in the frequency band between the frequencies f1 and f2 with its now-reduced energy level of the audio signal may increase the ability of the decoder to later effectively decode the watermark. There is not as much energy of the audio signal in the frequency band between the frequencies f1 and f2 now. The chances for detection of the watermark, once inserted in the frequency band between f1 and f2, have increased from prior to the creation of the spectral well. Thus, at 730 the method 700 includes inserting the watermark symbol in the spectral well.

The portion P2 between f1 and f2 may be a candidate for a spectral well as determined by the detection method 600 of FIG. 23. However, the amplitude of the neighboring portions P1 and P3 may be relatively low such that insertion of a watermark symbol of relatively high amplitude in the spectral well SW may be audibly noticeable. That is, P2 includes a spectral well, just not a very good one. The spectral portions P1 and P3 of the audio signal 5 may be amplified to create or enhance the spectral well.

Figure 25:
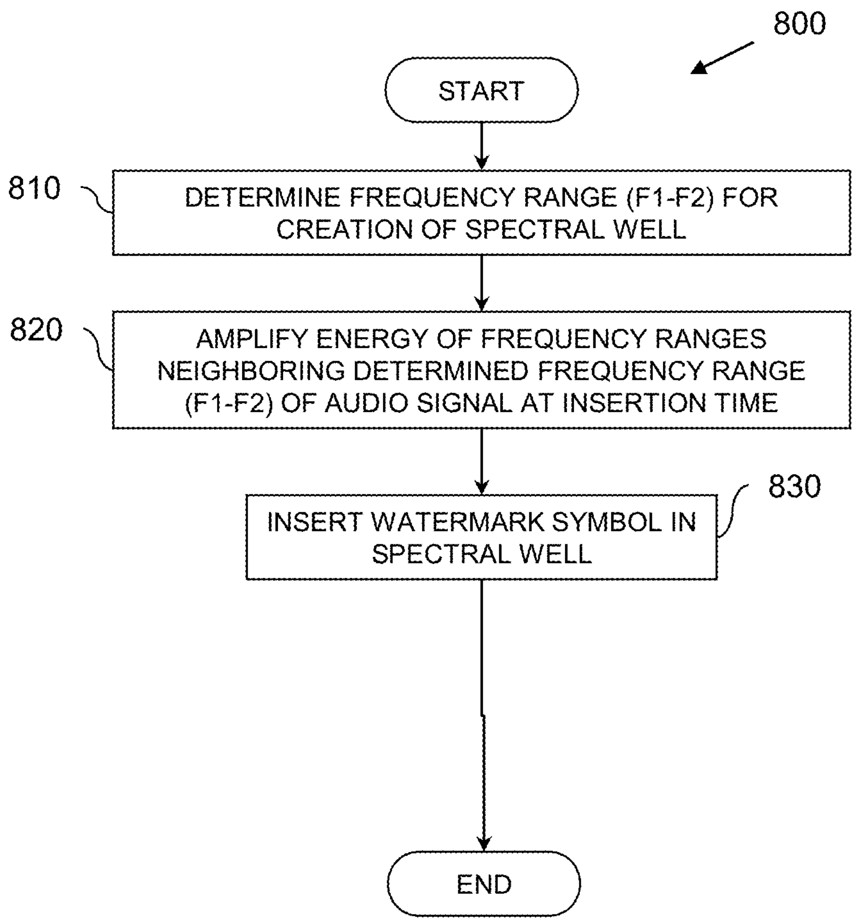
FIG. 25 illustrates a flow diagram for an example method for a machine or group of machines to watermark an audio signal.

FIG. 25 illustrates a flow diagram for an example method 800 for a machine or group of machines to watermark an audio signal. At 810, the method 800 determines a frequency range (i.e., spectral channel) at which a spectral well exists but needs enhanced. This determination may be made according to the detection method 600 of FIG. 23 in which, although amplitudes of spectral portions P1 and P3 are higher than that of spectral portion P2, the absolute values of one or more of the amplitudes of spectral portions P1 and P3 is still relatively low.

In this case, creating a spectral well corresponds to enhancement or amplification of energy of the audio signal in the frequency bands P1 and P3 neighboring the band P2 between the frequencies f1 and f2 beginning at the time determined for insertion of the watermark symbol. Therefore, at 820, the portions of the audio signal corresponding to the frequency ranges P1 and P3 are amplified beginning at the time determined for insertion of the watermark symbol. The spectral well is now an ideal spectral well in which to insert a watermark symbol S1 beginning at time t1. Thus, at 830 the method 800 includes inserting the watermark symbol in the spectral well.

The algorithms for inserting a watermark symbol S1 will be explained in more detail below. The algorithms may include spectral replacement, perceptual fusion, perceptual masking, and combinations thereof.

Figure 26:
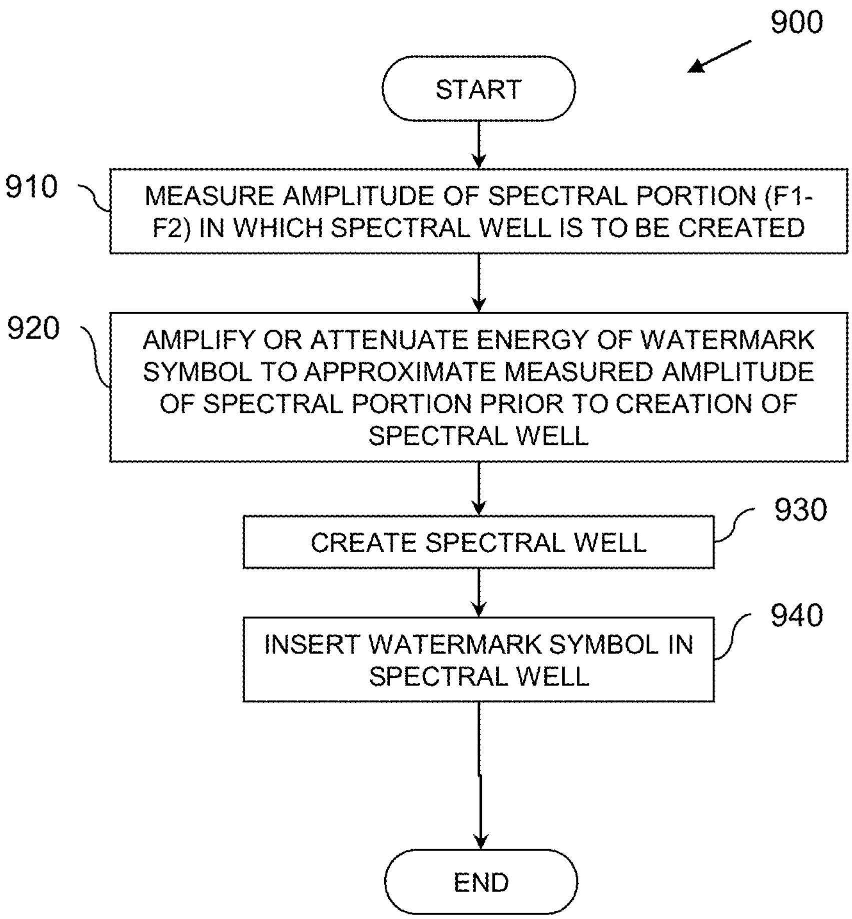
FIG. 26 illustrates a flow diagram for an example method for a machine or group of machines to watermark an audio signal.

FIG. 26 illustrates a flow diagram for an example method 900 for a machine or group of machines to watermark an audio signal. At 910, the method 900 may include, prior to creating the spectral well, measuring amplitude of the portion of the original audio signal corresponding to the frequency range between f1 and f2 in which the watermark symbol S1 is to be inserted at the time interval beginning at time t1. This is so that the portion of the original audio signal may be replaced with a watermark symbol that resembles the replaced audio signal portion. Ideally, the watermarked audio will sound equivalent to the original, but the watermark symbol has enough structure (i.e., amplitude and spectral/temporal width) to be decoded. At 920, the method 900 includes amplifying or attenuating amplitude of the symbol to be inserted such that amplitude of the symbol approximates the amplitude of the portion of the original audio signal corresponding to the frequency range between f1 and f2 and the time interval beginning at time t1.

At 930, the method 900 includes creating the spectral well by removing the portion of the original audio signal corresponding to the first frequency range between f1 and f2 and the time interval beginning at time t1. At 940, the method 900 includes at time t1, the symbol S1 that was amplified or attenuated to resemble the removed audio signal portion may be inserted in the spectral channel of the audio signal corresponding to the frequency range between f1 and f2 (i.e., in the spectral well) to replace the removed audio signal portion. The resulting watermarked audio signal may resemble or look similar to the original audio signal. Thus audibility of the inserted watermark symbol is minimized.

The algorithm for spectral fusion may involve calculating the amplitude of the watermarked symbol to be inserted based on the adjacent frequency portions so that perception of the newly inserted watermark symbol fuses with the neighboring portions of the audio signal.

Figure 27:
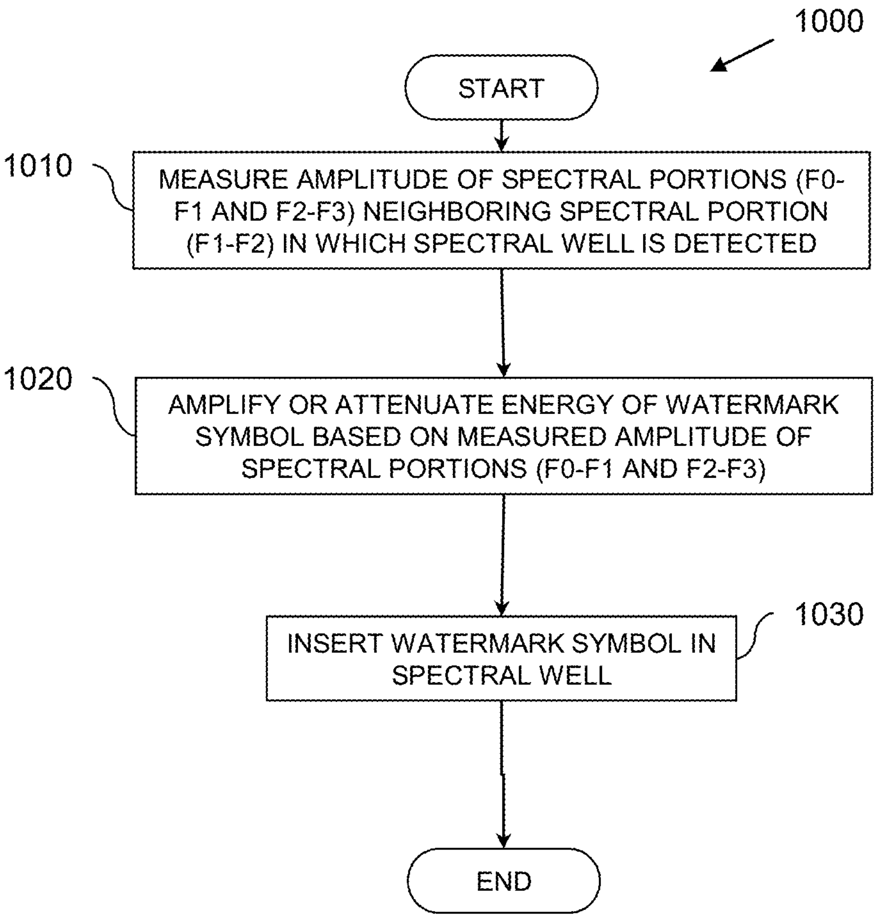
FIG. 27 illustrates a flow diagram for an example method for a machine or group of machines to watermark an audio signal.

FIG. 27 illustrates a flow diagram for an example method 1000 for a machine or group of machines to watermark an audio signal. At 1010, the method 1000 may include measuring amplitude at the time interval beginning at time t1 of the portions of the original audio signal corresponding to the frequency ranges between f0 and f1 and between f2 and f3 neighboring the frequency range between f1 and f2 in which the watermark symbol S1 is to be inserted. This is so that amplitude of the symbol S1 may be calculated taking these measurements into consideration. For example, amplitude of the symbol S1 may be calculated to be an average between the amplitude measured for the adjacent portions P1 (between f0 and f1) and P3 (between f2 and f3. Amplitude of the symbol S1 is such that perception of the newly inserted watermark symbol S1 in the spectral channel P2 should fuse in the vicinity of the portions P1 and P3 of the audio signal.

At 1030, the method 1000 includes beginning at time t1, the symbol S1 be inserted in the spectral channel of the audio signal corresponding to the frequency range between f1 and f2 (i.e., in the spectral well). The resulting watermarked audio signal may resemble or look similar to the original audio signal. To the ear it sounds as if it were still part of the speech signal even though it wasn't in the original.

While FIGS. 22-27 illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 28:
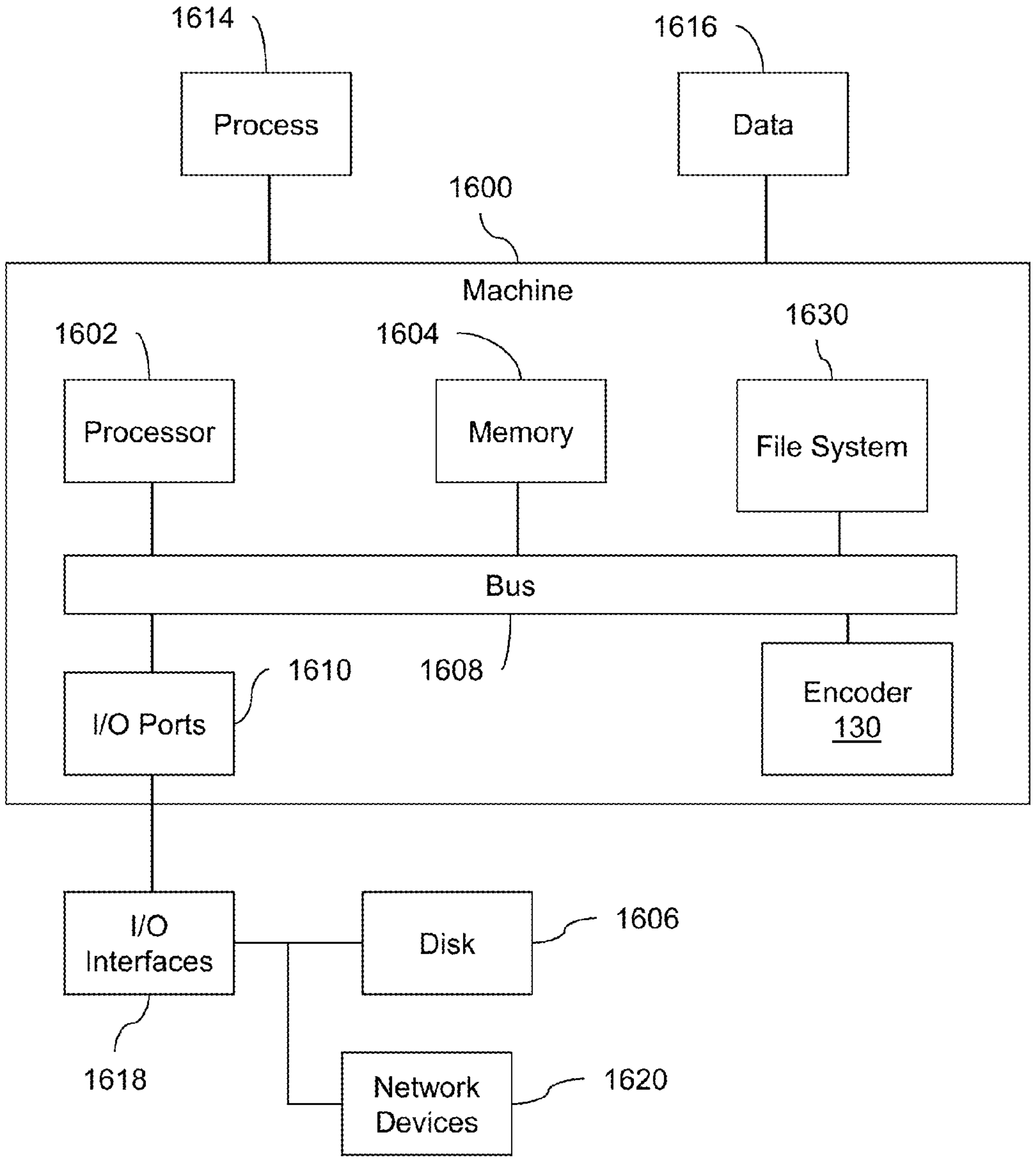
FIG. 28 illustrates a block diagram of an exemplary machine for watermarking an audio signal.

FIG. 28 illustrates a block diagram of an exemplary machine 1600 for watermarking an audio signal. The machine 1600 includes a processor 1602, a memory 1604, and I/O Ports 1610 operably connected by a bus 1608. In one example, the machine 1600 may include the encoder 130 as disclosed above, which may include the encode 10, the multiplier 12, the summer 14, the symbol time/amp controller, the spectral well processor 160, the amplitude and S/N controller 162 and the filter/amp 164, the meter 170, the controller 174, etc. Thus, the encoder 130 and specifically the members of the encoder 130 described above as performing specific functions or algorithms, whether implemented in machine 1600 as hardware, firmware, software, or a combination thereof may provide means for receiving the audio signal, receiving a watermark signal, creating a spectral well on the audio signal by removing or enhancing portions of the audio signal, inserting the watermark signal in the spectral well, determining amplitude of the portion of the audio signal corresponding to the frequency range, determining S/N of the watermarking signal to the audio signal corresponding to the frequency range in which the watermark is to be inserted, implementing a band-stop filter with a center frequency in the frequency range, passing the audio signal through the band-stop filter, amplifying or attenuating the watermark signal such that amplitude of the watermark signal approximates the amplitude of the portion of the audio signal removed to create the spectral well, determining a time range of the audio signal at which the watermark signal is to be inserted during the inserting, creating the spectral well on the audio signal by removing the portion of the audio signal corresponding to the frequency range in the determined time range, modulating of the watermark signal with a carrier frequency in the frequency range to obtain a modulated watermark signal, and superimposing the modulated watermark signal onto the audio signal, etc.

The processor 1602 can be a variety of various processors including dual microprocessor and other multi-processor architectures. The memory 1604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1606 may be operably connected to the machine 1600 via, for example, an I/O Interfaces (e.g., card, device) 1618 and an I/O Ports 1610. The disk 1606 can include, but is not limited to, devices like a magnetic disk drive, a solid state disk drive, a floppy disk drive, a tape drive, a Zip drive, a flash memory card, or a memory stick. Furthermore, the disk 1606 can include optical drives like a CD-ROM, a CD recordable drive (CD-R drive), a CD rewriteable drive (CD-RW drive), or a digital video ROM drive (DVD ROM). The memory 1604 can store processes 1614 or data 1616, for example. The disk 1606 or memory 1604 can store an operating system that controls and allocates resources of the machine 1600.

The bus 1608 can be a single internal bus interconnect architecture or other bus or mesh architectures. While a single bus is illustrated, it is to be appreciated that machine 1600 may communicate with various devices, logics, and peripherals using other busses that are not illustrated (e.g., PCIE, SATA, Infiniband, 1394, USB, Ethernet). The bus 1608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 1600 may interact with input/output devices via I/O Interfaces 1618 and I/O Ports 1610. Input/output devices can include, but are not limited to, a keyboard, a microphone, a pointing and selection device, cameras, video cards, displays, disk 1606, network devices 1620, and the like. The I/O Ports 1610 can include but are not limited to, serial ports, parallel ports, and USB ports.

The machine 1600 can operate in a network environment and thus may be connected to network devices 1620 via the I/O Interfaces 1618, or the I/O Ports 1610. Through the network devices 1620, the machine 1600 may interact with a network. Through the network, the machine 1600 may be logically connected to remote computers. The networks with which the machine 1600 may interact include, but are not limited to, a local area network (LAN), a wide area network (WAN), and other networks. The network devices 1620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. A method for a machine or group of machines to watermark an audio signal, the method comprising:

receiving an audio signal including:

a first spectral portion corresponding to a first frequency range, a second spectral portion corresponding to a second frequency range of higher frequency than the first frequency range, and a third spectral portion corresponding to a third frequency range of higher frequency than the second frequency range, and a first temporal portion corresponding to a first time range, a second temporal portion corresponding to a second time range of later time than the first time range, and a third temporal portion corresponding to a third time range of later time than the second time range;

receiving a watermark signal including multiple symbols;

measuring amplitude of at least one of:

the first spectral portion and the third spectral portion, or the first temporal portion and the third temporal portion;

amplifying or attenuating amplitude of a first symbol, from the multiple symbols, such that amplitude of the first symbol is based on the amplitude of the at least one of:

the first spectral portion and the third spectral portion, or the first temporal portion and the third temporal portion inserting the first symbol, from the multiple symbols, in a spectral well, the spectral well corresponding to at least one of:

the second spectral portion and a temporal portion when the amplitude of the first spectral portion and the amplitude of the third spectral portion exceed the amplitude of the second spectral portion, and the second temporal portion and a spectral portion when the amplitude of the first temporal portion and the amplitude of the third temporal portion exceed the amplitude of the second temporal portion.

2. The method of claim 1, comprising:

measuring amplitude of the at least one of:

the first spectral portion, the second spectral portion, and the third spectral portion, and the first temporal portion, the second temporal portion, and the third temporal portion; and when the amplitude of the first spectral portion and the amplitude of the third spectral portion exceed the amplitude of the second spectral portion or when the amplitude of the first temporal portion and the amplitude of the third temporal portion exceed the amplitude of the second temporal portion, continue to inserting the first symbol in the spectral well.

3. The method of claim 1, wherein the amplifying or the attenuating of the amplitude of the first symbol includes:

amplifying or attenuating amplitude of the first symbol such that amplitude of the first symbol is an average of the amplitude of the at least one of:

the first spectral portion and the third spectral portion, or the first temporal portion and the third temporal portion.

4. The method of claim 1, comprising, prior to the inserting of the first symbol:

attenuating at least one of the second spectral portion or the second temporal portion of the audio signal to create the spectral well.

5. The method of claim 4, wherein the attenuating the second spectral portion of the audio signal to create the spectral well includes:

implementing a band-stop filter with a center frequency in the second frequency range; and passing the audio signal through the band-stop filter.

6. The method of claim 1, comprising, prior to the inserting of the first symbol:

measuring amplitude of the second spectral portion or the second temporal portion;

amplifying or attenuating amplitude of the first symbol such that amplitude of the first symbol is equal to the amplitude of the second spectral portion or the second temporal portion prior to the inserting of the first symbol;

attenuating the second spectral portion or the second temporal portion of the audio signal to create the spectral well; and inserting the amplified or attenuated-amplitude first symbol in the spectral well.

7. The method of claim 1, wherein the amplifying or the attenuating of the amplitude of the first symbol includes:

amplifying or attenuating amplitude of the first symbol such that amplitude of the first symbol is an average of the amplitude of the at least one of:

the first spectral portion and the third spectral portion, or the first temporal portion and the third temporal portion; and attenuating the second spectral portion or the second temporal portion of the audio signal to create the spectral well; and inserting the amplified or attenuated-amplitude first symbol in the spectral well.

8. The method of claim 1, comprising, prior to the inserting of the first symbol:

amplifying at least one of the first spectral portion of the audio signal and the third spectral portion of the audio signal to create the spectral well, or amplifying at least one of the first temporal portion of the audio signal and the third temporal portion of the audio signal to create the spectral well.

9. The method of claim 1, comprising, prior to the inserting of the first symbol:

amplifying the first spectral portion of the audio signal and the third spectral portion of the audio signal to create the spectral well, or amplifying the first temporal portion of the audio signal and the third temporal portion of the audio signal to create the spectral well.

10. The method of claim 1, comprising:

measuring amplitude of the at least one of:

the first spectral portion, the second spectral portion, and the third spectral portion, or the first temporal portion, the second temporal portion, and the third temporal portion; and when the amplitude of the first spectral portion and the amplitude of the third spectral portion exceed the amplitude of the second spectral portion, amplifying the first spectral portion of the audio signal and the third spectral portion of the audio signal to enhance the spectral well, or when the amplitude of the first temporal portion and the amplitude of the third temporal portion exceed the amplitude of the second temporal portion, amplifying the first temporal portion of the audio signal and the third temporal portion of the audio signal to enhance the spectral well.

11. A machine or group of machines for watermarking audio, comprising:

an input that receives an audio signal and a watermark signal, the audio signal including at least one of:

a first spectral portion corresponding to a first frequency range, a second spectral portion corresponding to a second frequency range of higher frequency than the first frequency range, and a third spectral portion corresponding to a third frequency range of higher frequency than the second frequency range, or a first temporal portion corresponding to a first time range, a second temporal portion corresponding to a second time range of later time than the first time range, and a third temporal portion corresponding to a third time range of later time than the second time range, the watermark signal including multiple symbols; and an encoder circuit including a controller configured to:

measure amplitude of at least one of:

the first spectral portion and the third spectral portion, or the first temporal portion and the third temporal portion; and amplify or attenuate amplitude of a first symbol, from the multiple symbols, such that amplitude of the first symbol is based on the amplitude of the at least one of:

the first spectral portion and the third spectral portion, or the first temporal portion and the third temporal portion;

the encoder circuit configured to insert the first symbol, from the multiple symbols, in a spectral well, the spectral well corresponding to at least one of:

the second spectral portion and a temporal portion when the amplitude of the first spectral portion and the amplitude of the third spectral portion exceed the amplitude of the second spectral portion, and the second temporal portion and a spectral portion when the amplitude of the first temporal portion and the amplitude of the third temporal portion exceed the amplitude of the second temporal portion.

12. The machine or group of machines of claim 11, wherein the controller is configured to measure amplitude of the at least one of:

the first spectral portion, the second spectral portion, and the third spectral portion, or the first temporal portion, the second temporal portion, and the third temporal portion; and the encoder circuit is configured to, when the amplitude of the first spectral portion and the amplitude of the third spectral portion exceed the amplitude of the second spectral portion or when the amplitude of the first temporal portion and the amplitude of the third temporal portion exceed the amplitude of the second temporal portion, continue to insert the first symbol in the spectral well.

13. The machine or group of machines of claim 11, wherein the controller is configured to, prior to the encoder circuit inserting of the first symbol:

amplify or attenuate amplitude of the first symbol such that amplitude of the first symbol is an average of the amplitude of the at least one of:

the first spectral portion and the third spectral portion, or the first temporal portion and the third temporal portion.

14. The machine or group of machines of claim 11, wherein the encoder circuit includes a filter configured to, prior to the encoder circuit inserting of the first symbol:

attenuate the second spectral portion of the audio signal to create the spectral well.

15. The machine or group of machines of claim 14, wherein the filter is a band-stop filter with a center frequency in the second frequency range, and passing the audio signal through the band-stop filter attenuates the second spectral portion of the audio signal to create the spectral well.

16. The machine or group of machines of claim 11, wherein the encoder circuit includes one or more controllers configured to, prior to the inserting of the first symbol:

measure amplitude of the second spectral portion or the second temporal portion;

amplify or attenuate amplitude of the first symbol such that amplitude of the first symbol is equal to the amplitude of the second spectral portion or the second temporal portion prior to the inserting of the first symbol;

attenuate the second spectral portion or the second temporal portion of the audio signal to create the spectral well; and insert the amplified or attenuated-amplitude first symbol in the spectral well.

17. The machine or group of machines of claim 11, wherein the controller is configured to, prior to the encoder circuit inserting of the first symbol:

amplify or attenuate amplitude of the first symbol such that amplitude of the first symbol is an average of the amplitude of the at least one of:

the first spectral portion and the third spectral portion, or the first temporal portion and the third temporal portion; and attenuate the second spectral portion or the second temporal portion of the audio signal to create the spectral well; and insert the amplified or attenuated-amplitude first symbol in the spectral well.

18. The machine or group of machines of claim 11, wherein the encoder circuit includes an amplifier configured to, prior to the inserting of the first symbol, amplify at least one of the first spectral portion of the audio signal and the third spectral portion of the audio signal to create the spectral well, or amplify at least one of the first temporal portion of the audio signal and the third temporal portion of the audio signal to create the spectral well.

19. The machine or group of machines of claim 11, wherein the encoder circuit includes an amplifier configured to, prior to the inserting of the first symbol, amplify the first spectral portion of the audio signal and the third spectral portion of the audio signal to create the spectral well, or amplify the first temporal portion of the audio signal and the third temporal portion of the audio signal to create the spectral well.

20. The machine or group of machines of claim 11, wherein the controller is configured to:

measure amplitude of the at least one of:

the first spectral portion, the second spectral portion, and the third spectral portion, or the first temporal portion, the second temporal portion, and the third temporal portion; and wherein the encoder circuit includes an amplifier configured to, prior to the inserting of the first symbol, amplify:

the first spectral portion of the audio signal and the third spectral portion of the audio signal to enhance the spectral well, or the first temporal portion of the audio signal and the third temporal portion of the audio signal to enhance the spectral well.

* * * * *